US007285073B2

(12) United States Patent
Iriyama

(10) Patent No.: US 7,285,073 B2
(45) Date of Patent: Oct. 23, 2007

(54) ENGINE FUEL SUPPLY CONTROL DEVICE

(75) Inventor: Masahiro Iriyama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 194 days.

(21) Appl. No.: 10/981,712

(22) Filed: Nov. 5, 2004

(65) Prior Publication Data

US 2005/0124460 A1 Jun. 9, 2005

(30) Foreign Application Priority Data

| | | |
|---|---|---|
| Dec. 5, 2003 | (JP) | 2003-407894 |
| Dec. 5, 2003 | (JP) | 2003-407895 |
| Dec. 5, 2003 | (JP) | 2003-407896 |
| Dec. 5, 2003 | (JP) | 2003-407897 |
| Dec. 5, 2003 | (JP) | 2003-407898 |

(51) Int. Cl.
*B60W 10/06* (2006.01)

(52) U.S. Cl. ..................................................... 477/110

(58) Field of Classification Search ................ 477/107, 477/109, 110

See application file for complete search history.

(56) References Cited

U.S. PATENT DOCUMENTS

| | | | | |
|---|---|---|---|---|
| 5,146,891 | A * | 9/1992 | Nakazawa et al. | 123/325 |
| 5,390,637 | A * | 2/1995 | Yoshioka et al. | 123/333 |
| 5,433,676 | A * | 7/1995 | Abe et al. | 477/109 |
| 5,694,902 | A * | 12/1997 | Miwa et al. | 123/493 |
| 6,334,499 | B1 * | 1/2002 | Matsubara et al. | 180/65.2 |
| 6,623,401 | B2 * | 9/2003 | Idogawa et al. | 477/54 |
| 6,656,089 | B2 * | 12/2003 | Furukawa | 477/111 |

FOREIGN PATENT DOCUMENTS

| | | | |
|---|---|---|---|
| JP | S61-89943 | A | 5/1986 |
| JP | 2524336 | B2 | 5/1988 |
| JP | S64-32039 | A | 2/1989 |
| JP | S64-32040 | | 2/1989 |
| JP | H01-151742 | A | 6/1989 |
| JP | H01-152831 | U | 10/1989 |
| JP | H01-293236 | A | 11/1989 |
| JP | H02-61349 | | 3/1990 |
| JP | H02-119646 | A | 5/1990 |
| JP | H03-189346 | A | 8/1991 |
| JP | H04-143434 | A | 5/1992 |

(Continued)

*Primary Examiner*—Ha D. Ho
(74) *Attorney, Agent, or Firm*—Global IP Counselors, LLP

(57) ABSTRACT

An engine fuel supply control device is configured to stop supplying fuel to an engine when specific fuel cut-off condition has been met. The timing of the fuel cut-off is delayed depending on an operating state of the vehicle. Preferably, the engine fuel supply control device has an operating state detection section that detects an operating condition (e.g., a clutch position or a shifting operation), and a fuel supply stoppage section that stops supplying fuel to the engine when a specific delay time has elapsed since the specific fuel cut-off condition was met. Preferably, the fuel supply stoppage section selectively sets the specific delay time to a different delay time depending upon the detected operating condition detection, e.g., a first delay time is set if either the clutch is detected as disengaged or a shifting operation is detected as being in progress, otherwise a different delay time is set.

37 Claims, 18 Drawing Sheets

FOREIGN PATENT DOCUMENTS

| | | | |
|---|---|---|---|
| JP | H04-215531 | A | 8/1992 |
| JP | H04-219439 | A | 8/1992 |
| JP | 2605755 | | 2/1997 |
| JP | H11-270390 | A | 10/1999 |
| JP | 2002-147264 | A | 5/2002 |
| JP | 2003-175750 | A | 6/2003 |

* cited by examiner

ENGINE FUEL SUPPLY CONTROL DEVICE

BACKGROUND OF THE INVENTION

1. Field of the Invention

The present invention generally relates to a fuel supply control device for an engine. More specifically, the present invention relates to an engine fuel supply control device that stops the supply of fuel (performs fuel cut-off) after a specific delay time has elapsed since a specific fuel cut-off condition was met.

2. Background Information

Fuel cut-off in which the supply of fuel is stopped when a specific fuel cut-off condition has been met, such as whether the accelerator pedal has fully returned, has been performed in the past in order to prevent the air-fuel mixture from being too rich during deceleration and to reduce fuel consumption. One commonly known method of a fuel cut-off using a cut-in delay is disclosed in Japanese Patent No. 2,605,755 (p. 3, column block, lines 6-15). In this method, after a specific fuel cut-off condition has been met, the supply of fuel is not stopped right away, but is instead stopped after a specific delay time has elapsed. This delay time is changed according to whether the transmission range is in a neutral range or a drive range. If the supply of fuel is stopped suddenly because the accelerator pedal has fully returned and the throttle valve has completely closed, engine torque drops off sharply and jerks the driver forward too harshly. However, with a cut-in delay, engine torque is gradually reduced as the amount of air remaining in the intake passage downstream from the throttle valve decreases, and the supply of fuel is stopped at the point when engine torque has been sufficiently reduced, so the jerking sensation is lessened. In particular, with this design, when the transmission is in the neutral range, the delay time is set shorter so that the air/fuel ratio will not be transiently rich, which prevents emission problems, but when the transmission is in the drive range, the delay time is set longer so that torque (engine speed) can be reduced smoothly, which prevents deceleration shock and noise produced by the drive train.

With the aim of higher engine output and efficiency, the volume of collectors has been on the rise in recent years. In order to effectively minimize the jerking sensation during deceleration with an engine such as this, an increase in collector volume has been accompanied by the need to set the cut-in delay time longer than in the past.

In view of the above, it will be apparent to those skilled in the art from this disclosure that there exists a need for an improved engine fuel supply control device. This invention addresses this need in the art as well as other needs, which will become apparent to those skilled in the art from this disclosure.

SUMMARY OF THE INVENTION

It has been discovered that the following problems have been encountered with the above-mentioned cut-in delays in which a specific delay time is merely provided during fuel cut-off. These problems are particularly present in vehicles equipped with a manual transmission. In particular, stopping the supply of fuel later by using a cut-in delay is effective when the vehicle is in a drive state in which the clutch is engaged and the crankshaft and drive wheels are linked.

The above-mentioned Japanese Patent No. 2,605,755 discloses that the length of the delay time of a cut-in delay is switched according to the range of a manual transmission, with the delay time being set shorter with a neutral range and longer with other ranges. This technology does not factor in whether a shift is in progress. During an upshift, a long delay time is maintained until a neutral range is entered after clutch disengagement, and during this time the drop-off in engine speed is slow, which means that the above problems cannot be completely avoided.

However, during shifting, and particularly during an upshift in which a shift to a higher gear is made, if the supply of fuel continues until a specific delay time has elapsed even after the accelerator pedal has fully returned, then the drop-off in engine speed is slower, and in some cases disengagement of the clutch can even result in revving of the engine. Accordingly, a driver who wants to make smooth, shock-free shifts must wait for the engagement of the clutch while the engine speed drops to the optimal speed after shifting, and therefore cannot complete a shift quickly. If the driver forcibly engages the clutch before this optimal engine speed is reached, then the engine speed differential would produce a lurching sensation.

If the delay time of the cut-in delay were indiscriminately shortened in an effort to improve matching to the optimal engine speed after an upshift, it would be impossible to reduce the jerking sensation produced during deceleration. Moreover, the engine speed has to be raised toward the optimal engine speed after shifting in order to make a smooth shift during a downshift, in which the gear is changed to a lower position, but it is not easy to match the engine speed because of fuel cut-off. In some cases, it may be necessary to greatly raise the engine speed, which has temporarily dropped due to clutch disengagement, by depressing the accelerator pedal.

One way to deal with this problem is to shorten the delay time of the cut-in delay and lower the engine speed after clutch disengagement whenever the fuel cut-off condition is met and the clutch is disengaged, and the shift being performed is an upshift. The reason for maintaining the delay time when the shift being performed is a downshift is that the engine speed has to be raised toward the optimal post-shift speed in order to make a smooth downshift, and accelerating the decrease in engine speed by fuel cut-off is actually disadvantageous. If we assume here that the delay time is maintained every time a downshift is performed, this results in a problem in that while the accelerator pedal is depressed in order to match the engine speed, the engine speed ends up going too high. In this case, the engine speed needs to be quickly lowered toward the optimal speed.

However, the following problems have been encountered when the above-mentioned conventional fuel cut-off method (setting of delay time) is applied to vehicles equipped with a manual transmission.

Specifically, when a quick upshift is performed, in which the clutch pedal is depressed (the clutch is disengaged) simultaneously with lift-off from the accelerator pedal, a long delay time is maintained until the shift position enters the neutral range, and the decrease in engine speed is slow because fuel cut-off is not performed during this time. Also, since load (on the drive side) is eliminated by disengagement of the clutch, it is possible that engine revving will occur. Consequently, it is impossible to make a quick upshift that is free of shock.

In contrast, by shortening the delay time (setting it to 0) when the fuel cut-off condition has been met and the clutch is disengaged, engine revving is prevented and a quick upshift that is free of shock can be performed, and by lengthening the delay time when the clutch is engaged, it is possible to prevent deceleration shock. Thus, the delay time of the fuel cut-off can be varied according to whether the clutch is engaged or disengaged. With the above approach, however, a problem still remains when so-called double-clutching is performed during downshifting.

In double-clutching, first the clutch is disengaged, the shift position is put in the neutral range, and the clutch is engaged, then in this state the engine speed is matched by depressing the accelerator pedal to raise the engine speed up to a level corresponding to the gear position after the downshift, after which the clutch is once again disengaged and the gear is moved to the desired position, allowing a smooth shift (downshift) to be performed. When the fuel cut-off condition is met after the depression of the accelerator pedal has been completed, a long delay time is set because the clutch is engaged.

Accordingly, in the event that the engine speed rises too high while the accelerator pedal is depressed in the neutral range in order to match the engine speed, even though the fuel cut-off condition is met, no fuel cut-off will be performed until the set (long) delay time has elapsed, so the engine speed will not drop quickly, and the problem remains that matching the engine speed ends up taking a long time.

In addition, with a vehicle equipped with a manual transmission, the engine speed must be lowered to the optimal level during an upshift, and particularly in order to improve upshift feel. In recent years there has been a tendency for intake collectors to be made larger in order to raise engine output and efficiency, and the delay time of fuel cut-off has been getting longer. Thus, in the prior art discussed above, the decrease in engine speed was even slower during an upshift, which prevented quick upshifts and resulted in upshift shock.

The present invention was conceived in an effort to solve or lessen these problems. Thus, one object of the present invention is to eliminate the problems caused by a cut-in delay during shifting so as to minimize the jerking sensation that accompanies fuel cutoff by a cut-in delay, and to make faster shifts possible.

Another object of the present invention to afford quick and easy adjustment of engine speed and make faster shifts possible, during both upshifts and downshifts, with an engine fuel supply control device that performs fuel cut-off by cut-in delay.

Another object of the present invention is to allow a driver to quickly and effectively adjust the engine speed toward the optimal post-shift speed during a downshift with an engine fuel supply control device that performs fuel cut-off by cut-in delay.

Another object of the present invention is to prevent deceleration shock caused by fuel cut-off, while allowing quick and smooth (or without shock) shifts, with an engine equipped with a manual transmission.

In view of the above, some of the above objects can be basically attained by providing an engine fuel supply control device for an engine connected to a drive wheel via a driver operable clutch and a transmission disposed between the engine and the drive wheel. The engine fuel supply control device basically comprises an operating state detection section, a fuel cut-off determination section and a fuel supply stoppage section. The operating state detection section is configured to detect at least one of a clutch position of the driver operable clutch and a shifting operation of the transmission. The fuel cut-off determination section is configured to determine if a specific fuel cut-off condition has been met. The fuel supply stoppage section is configured to stop a supply of fuel to the engine when a specific delay time has elapsed since the specific fuel cut-off condition was met. The fuel supply stoppage section is further configured to selectively set the specific delay time to different lengths of time depending on a detection status of either the clutch position being disengaged or the shifting operation being in progress.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
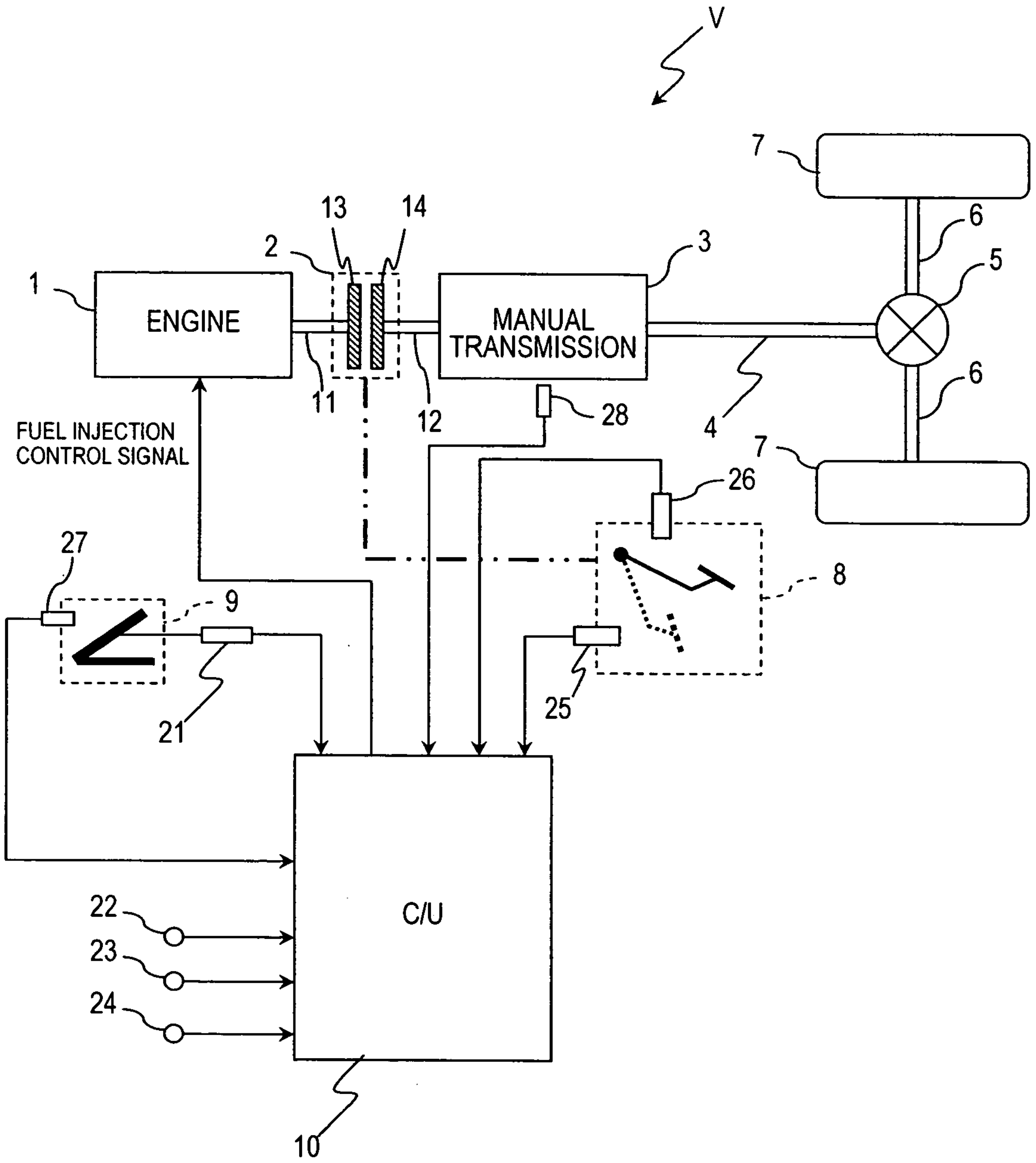
FIG. 1 a schematic diagram of a drive system of a vehicle configured and arranged with an engine fuel supply control device in accordance with a first embodiment of the present invention.

Referring initially to FIGS. 1-4, a vehicle V is schematically illustrated that is equipped with an engine fuel supply control device in accordance with a first embodiment of the present invention. FIG. 1 illustrates the configuration of the drive system of pertaining to an embodiment of the present invention. This vehicle V has a drive train that includes an engine 1, a clutch 2, a manual transmission 3, a propeller shaft 4, a differential 5 and a pair of wheel drive shafts 6. These components of the drive train are relatively conventional components, and thus, these parts will not be discussed or illustrated in detail herein. The wheel drive shafts 6 are coupled to a pair of drive wheels 7 in a conventional manner to rotate the drive wheels 7. The clutch 2 is engaged or disengaged according to the position of a clutch pedal 8 that is manually depressed by the driver's foot. The rotational speed of the engine 1 is manually controlled by an accelerator pedal 9 that is manually depressed by the driver's foot. An engine control unit 10 is provided that controls the operation of the engine 1 in response to the actuation of the pedals 8 and 9 and other detected operating conditions as discussed below.

With the first embodiment of the present invention, the engine control unit 10 controls the fuel being supply to the injectors of the engine 1. When the fuel cut-off condition is met, the length of the delay time for actually stopping the supply of fuel is varied according to whether or not the clutch 2 is disengaged or a shift is in progress. Accordingly, by making the delay time shorter in the former case than in the latter case, the decrease in engine speed, particularly during an upshift, is faster and smoother, which makes possible faster shifting.

The engine 1 has an output shaft or crankshaft 11, which is connected to the input side of the clutch 2. The manual transmission 3 has an input shaft 12, which is connected to the output side of a clutch 2. More specifically, the crankshaft 11 of the engine 1 is linked to a flywheel or clutch disk 13, while the input shaft 12 of the manual transmission 3 is linked to a clutch plate 14. This flywheel or clutch disk 13 forms a friction surface on the input side of a clutch 2, while the clutch plate 14 forms a friction surface on the output side of the clutch 2. The clutch plate 14 is pressed against the flywheel or clutch disk 13 by operation of a clutch pedal 8 by the driver. Thus, the clutch 2 is engaged or disengaged according to the position (depression position) of the clutch pedal 8 that is operated by the driver. The output shaft of the transmission 3 is linked to the wheel drive shafts 6 and the drive wheels 7 via the propeller shaft 4 and the differential 5 in a conventional manner. Accordingly, the driver lifts off from the clutch pedal 8 so that the clutch pedal 8 returns to its original position and the clutch 2 is engaged, the crankshaft 11 and the input shaft 12 of the transmission 3 are mechanically linked and power is transmitted from the engine 1, through the transmission 3 to the drive wheels 7. In other words, the crankshaft 11 and the drive wheels 7 are connected and the power of the engine 1 is transmitted to the drive wheels 7. On the other hand, the driver depresses the clutch pedal 8 and disengages the clutch 2, the mechanical link between the crankshaft 11 and the input shaft 12 of the transmission 3 is released, which interrupts the transmission of power from the engine 1 to the drive wheels 7.

The transmission 3 is shifted by operation of a shift lever (not shown) by the driver. This transmission 3 is equipped with a synchromesh mechanism, so that gears turning at different speeds can be quickly synchronized during a shift, affording a smoother shift operation. A synchromesh mechanism is well known and will not be described here in detail, but a key-type inertia lock, pin-type inertia lock, or servo-type inertia lock can also be employed.

Now, the operation of the engine 1 as controlled by the control unit 10 in accordance with the present invention will now be discussed. The control unit 10 preferably includes a microcomputer with a fuel injection control program that is configured to execute the various processing steps as discussed below. The control unit 10 receives input signals from various sensors (described below) that serve to detect the operating state of the engine 1 and executes the controls of the present invention based on these signals. The control unit 10 can also include other conventional components such as an input interface circuit, an output interface circuit, and storage devices such as a ROM (Read Only Memory) device and a RAM (Random Access Memory) device. The memory circuit stores processing results and control programs. The RAM of the control unit 10 stores statuses of operational flags and various control data for the control program. The ROM of the control unit 10 stores various operations for the control program. The control unit 10 is capable of selectively controlling any of the components of the driving force control apparatus in accordance with the control program. It will be apparent to those skilled in the art from this disclosure that the precise structure and algorithms for control unit 10 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

The control unit 10 is also operatively coupled to an accelerator pedal sensor 21, a crank angle sensor 22, an engine coolant temperature sensor 23, a vehicle speed sensor 24, a first clutch pedal switch or sensor 25, a second clutch pedal switch or sensor 26, an idle switch or sensor 27, and a neutral position switch or sensor 28. The accelerator pedal sensor 21 is configured and arranged to detect the accelerator position APO (i.e., the amount the accelerator pedal 9 is depressed by the driver), and output a signal to the control unit 10 that is indicative of the accelerator position APO. Of course, a throttle valve opening sensor can be used in place of the accelerator pedal sensor 21 with minor adjustments. The crank angle sensor 22 is configured and arranged to detect the engine crank angle, and output a signal to the control unit 10 that is indicative of the engine crank angle. The engine speed Ne can be calculated based on the detection signals from the crank angle sensor 22. The temperature sensor 23 is configured and arranged to detect the cooling water or coolant temperature Tw, and output a signal to the control unit 10 that is indicative of cooling water or coolant temperature Tw. The vehicle speed sensor 24 is configured and arranged to detect the vehicle speed VSP, and output a signal to the control unit 10 that is indicative of the vehicle speed VSP. The first clutch pedal switch or sensor 25 is configured and arranged to detect operation of the clutch pedal 8 to disengage the clutch 2, and output a signal to the control unit 10 that is indicative of current engagement or disengagement state of the clutch 2 due to operation of the clutch pedal 8. Preferably, the first clutch pedal switch or sensor 25 is switched ON in a state in which the clutch pedal 8 has been fully depressed and the clutch 2 is fully disengaged. The second clutch pedal switch or sensor 26 is configured and arranged to detect a semi-engaged state of the clutch 2 by operation of the clutch pedal 8, and output a signal to the control unit 10 that is indicative of semi-engaged state of the clutch 2 by operation of the clutch pedal 8. In other words, the first clutch pedal switch 25 is operated at a deep depressed position of the clutch pedal 8 that detects that the clutch 2 is in a fully disengaged state, and the second clutch pedal switch 26 is operated at a shallow depressed position of the clutch pedal 8. The idle switch 27 is configured and arranged to detect an idle state of the engine 1 or an idle operation demand on the engine 1 based on the position of the accelerator pedal 9, and output a signal to the control unit 10 that is indicative of the idle state of the vehicle when idle switch 27 is switched ON, i.e., when accelerator pedal 9 has fully returned or a fully closed throttle valve state. The neutral position switch or sensor 28 is configured and arranged to detect when the manual transmission 3 has been shifted to a neutral (non-driving) position, and output a signal to the control unit 10 that is indicative of the manual transmission 3 having been shifted to a neutral (non-driving) position. Thus, the neutral switch 28 operates when the transmission 3 is in a neutral state or the neutral (non-driving) position. Depending on the processing of the control unit 10, either the first clutch pedal switch or sensor 25 or the neutral position switch or sensor 28 acts as a start-control engine inhibitor switch.

In this first embodiment, the first clutch switch or sensor 25 is preferably employed as the start-control engine inhibitor switch. The control unit 10 interrupts the connection between the starter and its power supply, and thereby prevents start-up, when this engine inhibitor switch is in the OFF position (that is, when the clutch 2 is engaged) at the time of start-up of the engine 1.

The control unit 10 controls fuel supplied to the injectors (not shown) of the engine 1, on the basis of various types of inputted control information. In other words, the control unit 10 executes engine controls such as fuel supply control (fuel injection control) on the basis of various types of inputted signal. Specifically, under normal circumstances the control unit 10 drives the fuel injectors with a control amount corresponding to the operating state of the engine 1, and the optimal amount of fuel for that engine operating state is supplied to the engine 1. However, when the specific fuel cut-off condition has been met, the value of this control amount is forcibly set to 0 and the supply of fuel to the engine 1 is stopped after a specific delay time has elapsed.

The operation of the control unit 10 will now be described through reference to the flowchart shown in FIG. 2, which is a flowchart of the fuel injection quantity calculation routine or so called the fuel injection control routine. This fuel injection quantity calculation routine is actuated by turning on the ignition switch, and is executed at specific time intervals thereafter. The fuel injection quantity Qf of the injectors are set in this routine.

In step S10, the operating state of the engine 1 is read by the control unit 10. In other words, the control unit 10 reads the detection signals which include, but not limited to the signals mentioned above, e.g., the accelerator pedal position APO, the engine speed Ne, the cooling water temperature Tw, the vehicle speed VSP and so forth.

In step S20, the fuel injection quantity Qf is calculated on the basis of the operating state of the engine 1 read in the previous step. For example, the fuel injection quantity Qf is preferably calculated by referring to a pre-stored fuel injection quantity map in which the base fuel injection quantities Qfbase are allocated according to the accelerator pedal opening APO and the engine speed Ne. Upon calculating the Qfbase corresponding to the read APO and Ne, the calculated Qfbase is corrected according to the cooling water temperature Tw, and this corrected value thus obtained is setting as the fuel injection quantity Qf.

In step S30, the control unit 10 determines whether or not a fuel cut-off flag Fcut is set to 0. If the fuel cut-off flag Fcut is set to 0, then the routine proceeds to step S110. However, if fuel cut-off flag Fcut is not set to 0, then the routine proceeds to step S40. The fuel cut-off flag Fcut is usually set to 0 (when the specific fuel cut-off condition is not met), and is switched to 1 when the control unit 10 determines in the fuel cut-off routine (discussed below) that the specific fuel cut-off condition has been met.

In step S40, a clutch pedal switch signal SWcl1 from the first clutch pedal switch 25 is read, and the control unit 10 determines whether or not the read value of SWcl1 is 1. If the clutch pedal switch signal SWcl1 is set to 1, then the routine proceeds to step S50, and otherwise proceeds to step S60. The clutch pedal switch signal SWcl1 is set to 1 when the clutch pedal 8 has been fully depressed and the clutch 2 is fully disengaged, and all other times is set to 0. Thus, the control unit 10 receives the clutch pedal switch signal SWcl1 from the first clutch pedal switch or sensor 25. Step S40 together with the first clutch pedal switch or sensor 25 constitute an engagement or disengagement detection section.

In step S50, a specific prescribed value CNT1, which determines the length of the delay time of the cut-in delay, is set to a first value a1. The first value a1 is set smaller than a second value a2 (discussed next).

In step S60, the specific prescribed value CNT1 is set to the second value a2 that is larger than the first value a1.

In step S70, the count value CNT is incremented by one. This count value CNT indicates the elapsed time since the fuel cut-off condition was met and the fuel cut-off flag Fcut was switched to 1.

In step S80, the control unit 10 determines whether or not the incremented CNT has reached the specific prescribed value CNT1. If the incremented CNT has reached the specific prescribed value CNT1, the control unit 10 determines that the specific delay time determined by the value CNT1 has elapsed since the fuel cut-off condition was met, so the routine proceeds to step S90, but if the specific prescribed value CNT1 has not been reached, then the routine proceeds to step S110.

In step S90, the count value CNT is set to 0.

In step S100, the fuel injection quantity Qf is set to 0. As a result, the supply of fuel to the engine 1 is stopped after the specific delay time has elapsed since the fuel cut-off condition was met.

In step S110, the fuel injection quantity Qf set as above is termed the output injection quantity Qfset, and a drive pulse Ti whose width corresponds to this output injection quantity Qfset is outputted to the fuel injectors. The fuel injectors are driven by this drive pulse Ti, and fuel is supplied to the engine 1 in the output injection quantity Qfset. However, when the fuel cut-off condition is met, as discussed above, the supply of fuel to the engine 1 is stopped after a delay time corresponding to CNT1 has elapsed.

Figure 3:
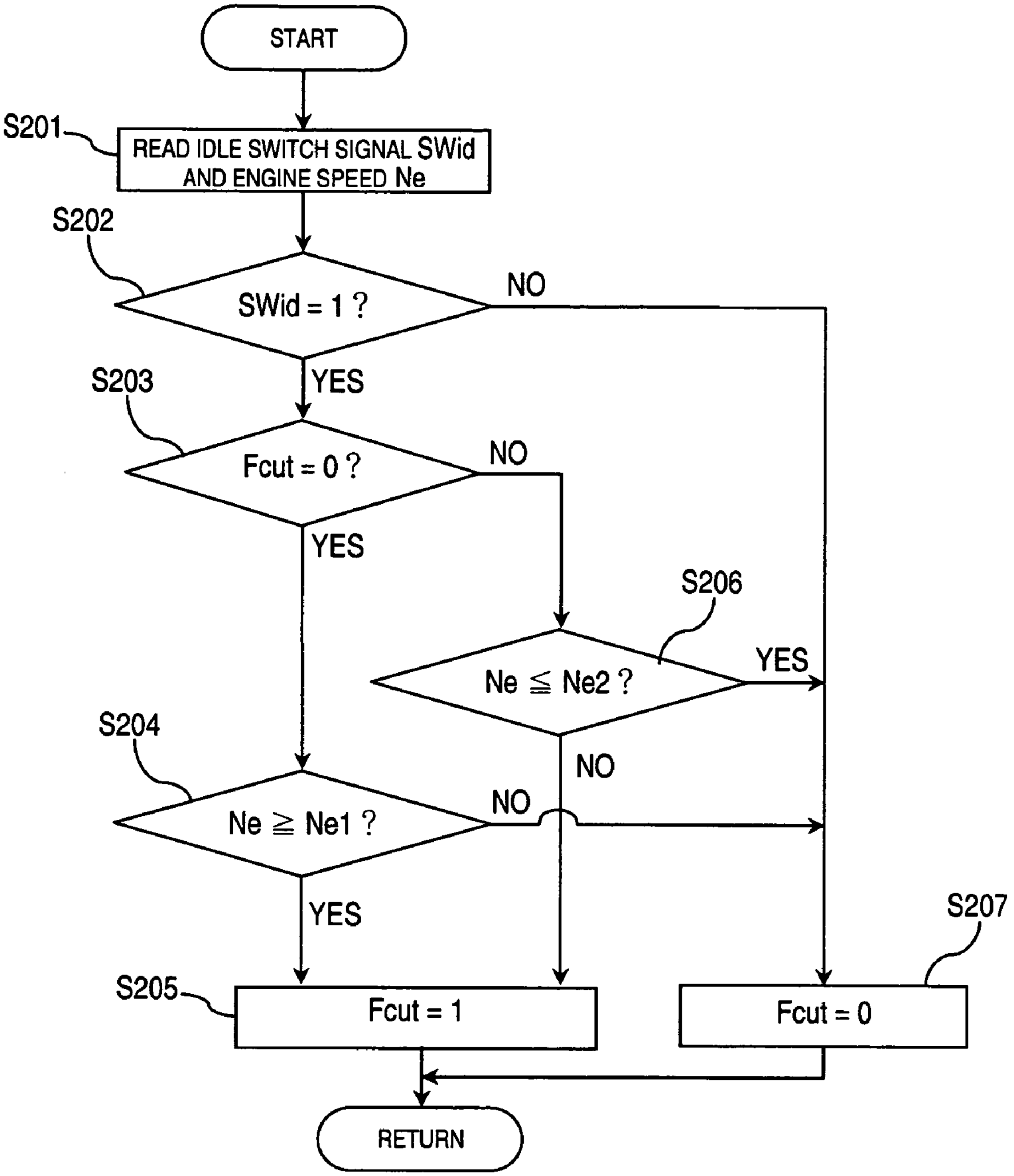
FIG. 3 is a flowchart illustrating the processing executed by a fuel cut-off routine of the control unit in accordance with the first embodiment of the present invention.

FIG. 3 is a flowchart of the fuel cut-off routine. This routine is actuated by turning on the ignition switch, and is executed at specific time intervals thereafter. The fuel cut-off determination flag Fcut is set in this routine.

In step S201, an idle switch signal SWid from the idle switch 27 and the engine speed Ne from the crank angle sensor 22 are read.

In step S202, the control unit 10 determines whether or not the read value of the idle switch signal SWid is 1. If the idle switch signal SWid is 1, then the routine proceeds to step S203, and otherwise proceeds to step S207. The idle switch signal SWid is set to 1 when the accelerator pedal 9 has fully returned, and otherwise is set to 0.

In step S203, the control unit 10 determines whether or not the fuel cut-off flag Fcut is 0. If the fuel cut-off flag Fcut is 0, then the routine proceeds to step S204, and otherwise (that is, if fuel cut-off is in progress) proceeds to step S206.

In step S204, the control unit 10 determines whether or not the currently read engine speed Ne is greater than or equal to a specific prescribed value Ne1 or $Ne_{cut}$. If the currently read engine speed Ne is greater than or equal to a specific prescribed value Ne1, the control unit 10 determines that the engine 1 is in a fuel cut-off execution speed range in which fuel cut-off can be performed, and the routine proceeds to step S205. However, if the currently read engine speed Ne is less than the specific prescribed value Ne1, then the routine proceeds to step S207.

In step S205, the fuel cut-off flag Fcut is set to 1, and the supply of fuel to the engine 1 is stopped when a specific delay time has elapsed in the previous fuel injection quantity calculation routine.

In step S206, the control unit 10 determines whether or not the engine speed Ne has decreased and the currently read engine speed Ne has reached a specific prescribed value Ne2 or $Ne_{rcv}$ after the supply of fuel has been stopped. If this value has been reached, the supply of fuel is to be restarted, so the routine proceeds to step S207, but if this value has not been reached, the supply of fuel is to be left stopped, so the routine proceeds to step S205.

In step S207, the fuel cut-off flag Fcut is set to 0.

Figure 4:
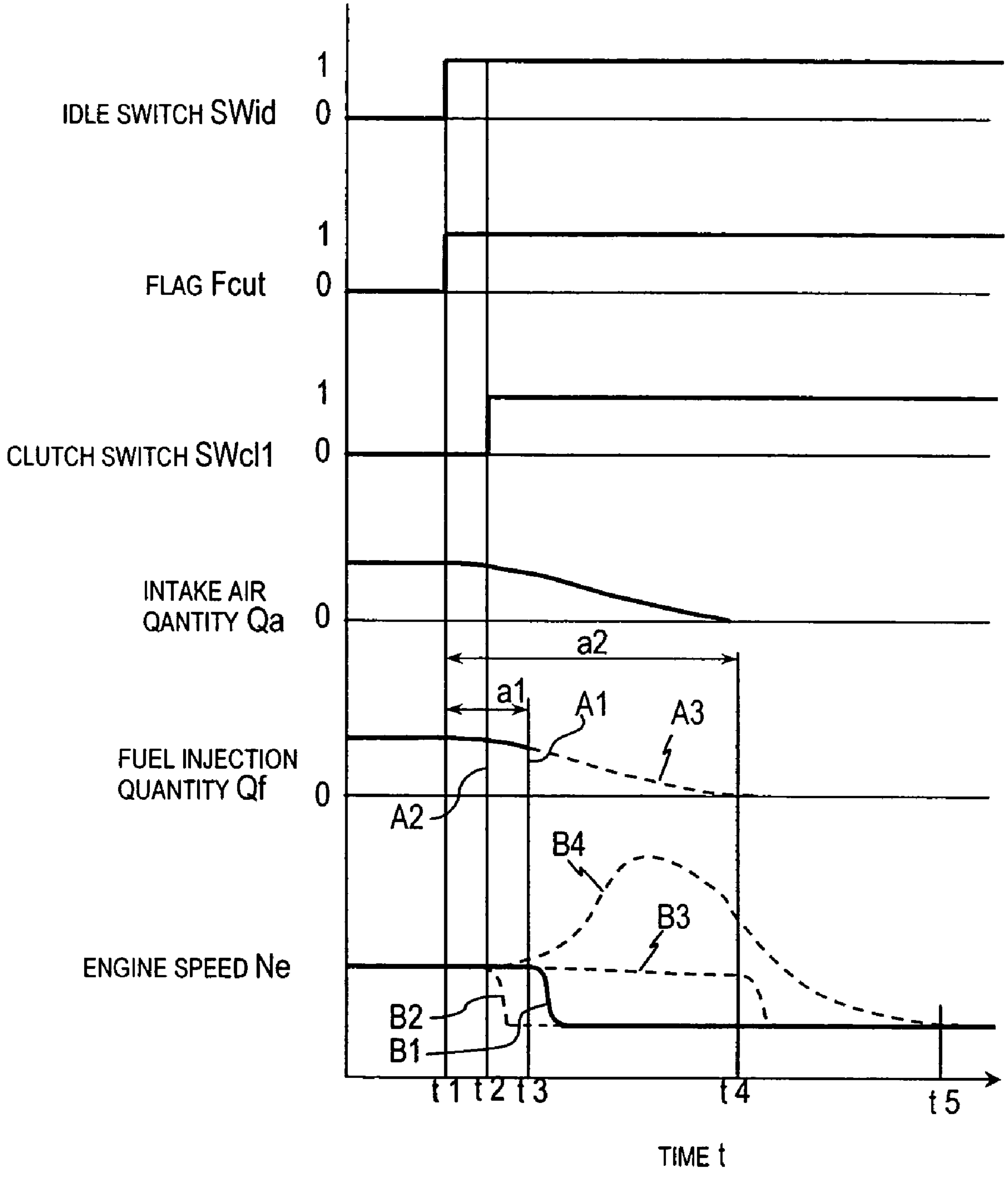
FIG. 4 is a time chart illustrating the change in the fuel injection quantity and other parameters during fuel cut-off by the engine fuel supply control device in accordance with the first embodiment of the present invention.

Next, the time chart of FIG. 4 will be used to describe the fuel cut-off by cut-in delay pertaining to this embodiment. FIG. 4 is a time chart of the fuel injection quantity Qf and so forth with a cut-in delay.

When the accelerator pedal 9 has fully returned and the idle switch 27 is switched ON (time t1), the fuel cut-off flag Fcut is switched to 1 and the count value CNT is incremented by one on the condition that the engine speed Ne is in the fuel cut-off execution speed range determined by the specific prescribed value $Ne_{cut}$ or Ne1. The specific prescribed value CNT1 that determines the length of the delay time in the cut-in delay is switched here according to whether the first clutch pedal switch 25 is ON or not. The delay time is set to the first value a1 in the former case, and to the second value a2, which is larger than the first value a1, in the latter case. The supply of fuel is continued until the count value CNT reaches the specific prescribed value CNT1 after the fuel cut-off flag Fcut has been switched to 1. Therefore, during this time there is not much of a decrease in the engine speed Ne. Once the count value CNT reaches the specific prescribed value CNT1 (times t3 and t4), the fuel injection quantity Qf is set to 0 and the supply of fuel to the engine 1 is stopped regardless of the operating state of the engine 1. After this, the shift (an upshift in this case) is completed, and the accelerator pedal 9 is depressed again, whereupon the fuel cut-off flag Fcut is set to 0 and the supply of fuel is restarted. Even when no shift is in progress, the fuel cut-off flag Fcut is set to 0 and the supply of fuel is restarted when the engine speed Ne reaches a fuel cut-off recover speed range determined by the specific prescribed value Ne rcv or Ne2.

Figure 2:
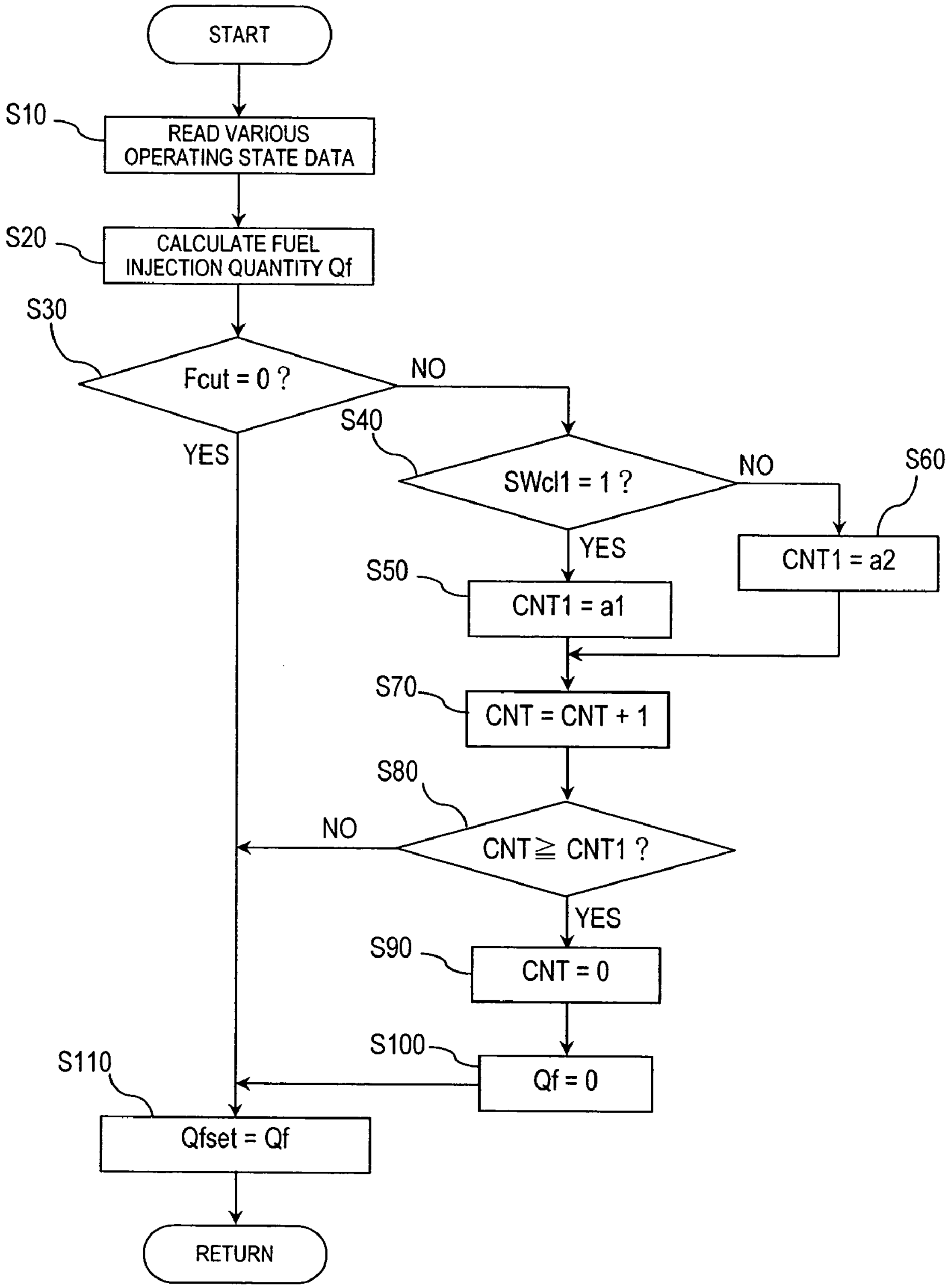
FIG. 2 is a flowchart illustrating the processing executed by a fuel injection quantity calculation routine of the control unit in accordance with the first embodiment of the present invention.

In this embodiment, step S40 in the flowchart shown in FIG. 2 constitutes the clutch disengagement detection section or shifting detection section, step S202 to step S204 in the flowchart shown in FIG. 3 constitute the fuel cut-off determination section, and step S50 to step S100 in the flowchart shown in FIG. 2 constitute the fuel supply stoppage section.

The following effects are obtained with this embodiment.

First, in this embodiment, when the fuel cut-off condition has been met and the fuel cut-off flag Fcut is switched to 1, the clutch pedal switch signal SWcl1 is read, the control unit 10 determines whether or not the clutch 2 is disengaged on the basis of the read value of SWcl1, and the length of the delay time is varied according to whether or not the clutch is disengaged. In this embodiment, the delay time is set shorter in the former case and set longer in the latter case. Accordingly, when the vehicle is in a drive state in which the clutch is engaged, cut-in delay in which the delay time is set sufficiently long is performed, which prevents a sudden decrease in engine torque during deceleration and minimizes the resulting jerking sensation (A3 in FIG. 4). Meanwhile, during shifting (more specifically, during an upshift) when the clutch 2 is disengaged, cut-in delay in which the delay time is set shorter is performed, which speeds up and smoothes the decrease in the engine speed Ne after clutch disengagement, allowing a shift to be made more quickly (B1 in FIG. 4).

Second, an engine inhibitor switch, with which manual transmission vehicles are commonly equipped, is employed as the first clutch pedal switch 25 in this embodiment, so the additional cost entailed by implementing the present invention can be kept to a minimum.

The example given above was for a case in which the supply of fuel was continued to a certain extent even after the clutch 2 was disengaged, both when the clutch 2 is being disengaged and when a fuel cut-off condition was met. This prevents the occurrence of a jerking sensation upon re-engagement when the clutch 2 is accidentally disengaged even though the driver does not intend to shift gears. With the present invention, however, it is also possible to stop the supply of fuel as soon as the clutch 2 has been disengaged after the fuel cut-off condition is met, so that the engine speed Ne will decrease even more quickly during an upshift.

Second Embodiment

Figure 5:
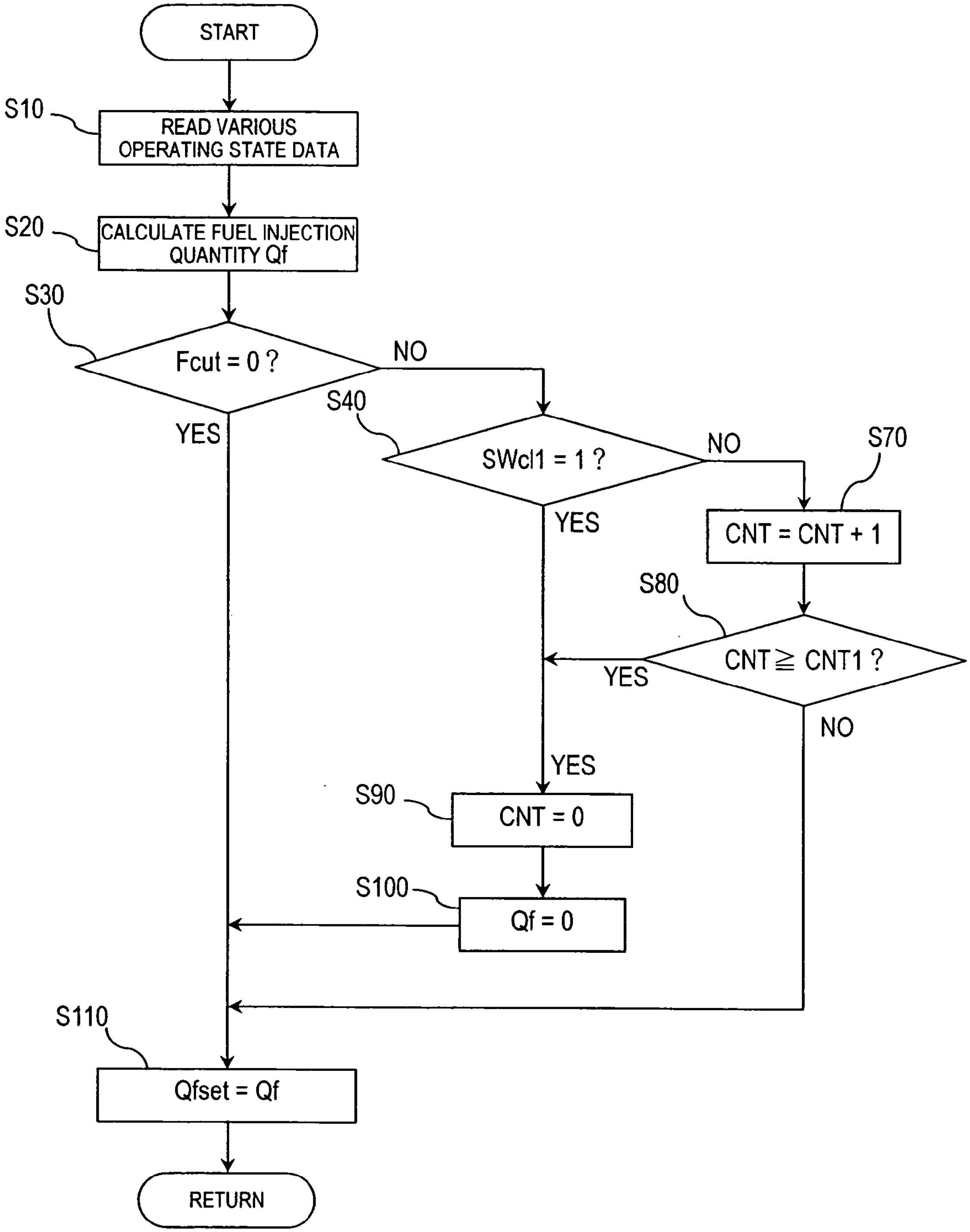
FIG. 5 is a flowchart illustrating the processing executed by a fuel injection quantity calculation routine of the control unit in accordance with a second embodiment of the present invention.

Referring now to FIG. 5, a modified fuel injection quantity calculation routine is illustrated that is executed by the control unit 10 of the vehicle V that is equipped as shown in FIG. 1. In view of the similarity between the first and second embodiments, the parts or steps of the second embodiment that are identical to the parts or steps of the first embodiment will be given the same reference numerals. Moreover, the descriptions of the parts or steps of the second embodiment that are identical to the parts or steps of the first embodiment may be omitted for the sake of brevity. In other words, unless otherwise specified, the processing executed by the control unit 10 in the second embodiment is the same as the first embodiment. Thus, the modified processing will now be discussed.

FIG. 5 is a flowchart illustrating the fuel injection quantity calculation routine when the supply of fuel is stopped as soon as the clutch 2 is disengaged. This routine is also actuated by turning on the ignition switch, and is executed at specific time intervals thereafter. The fuel injection quantity Qf of the second embodiment is set by this routine. In FIG. 5, the steps that perform the same actions as in the previous embodiment are given the same reference number as in the flowchart shown in FIG. 2.

A specific operating state, which includes the accelerator pedal opening APO, the engine speed Ne, and so forth, is read (step S10), and the fuel injection quantity Qf is calculated on the basis of the operating state thus read (step S20), after which the calculated Qf is set to the output injection quantity Qfset (step S110) when the fuel cut-off flag Fcut is 0 in step S30. Meanwhile, if the fuel cut-off flag Fcut is 1, then the routine proceeds to step S40, and it is determined whether or not the first clutch pedal switch 25 is ON. If it is ON, then the routine proceeds directly to step S90, and in step S100 the supply of fuel is immediately stopped along with the disengagement of the clutch 2. If, however, the switch is OFF, then the routine proceeds to step S70, and it is determined whether or not the specific delay time has elapsed since the fuel cut-off condition was met (step S80), and until such time, the supply of fuel is continued. Once this time has elapsed, then the routine proceeds to step S90 and the supply of fuel is stopped.

In this second embodiment, step S40 in the flowchart shown in FIG. 5 constitutes the clutch disengagement detection section or shifting detection section, and step S70 to step S100 in the same flowchart constitute the fuel supply stoppage section. step S202 to step S204 in the flowchart shown in FIG. 3 constitutes the fuel cut-off determination section, which is the same the first embodiment.

With this embodiment, the following effects are obtained in addition to the first and second effects discussed above.

In this embodiment, when the fuel cut-off condition is met and it is then detected that the clutch 2 is disengaged, the fuel injection quantity Qf is set to 0 (A2 in FIG. 4) and the supply of fuel is immediately stopped. If the supply of fuel is continued even when the clutch 2 has been disengaged, disengagement of the clutch 2 may result in revving of the engine 1, in which there is a significant increase in the engine speed Ne, so that it takes longer to adjust to the optimal engine speed after shifting (B4 in FIG. 4), but this revving of the engine 1 can be avoided by immediately stopping the supply of fuel, so shifts can always be made faster than in the previous embodiment.

Third Embodiment

Figure 6:
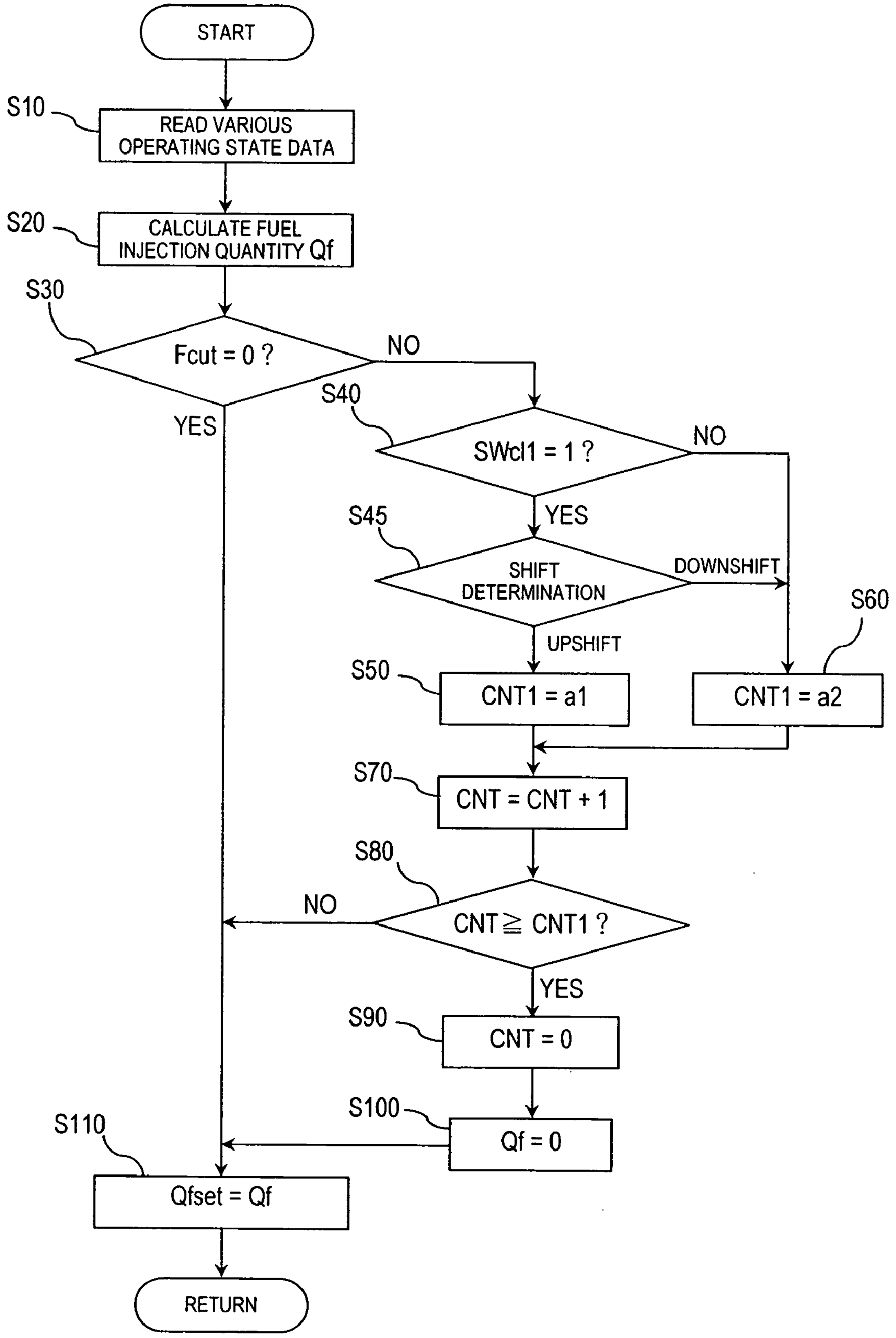
FIG. 6 is a flowchart illustrating the processing executed by a fuel injection quantity calculation routine of the control unit in accordance with a third embodiment of the present invention.
Figure 7:
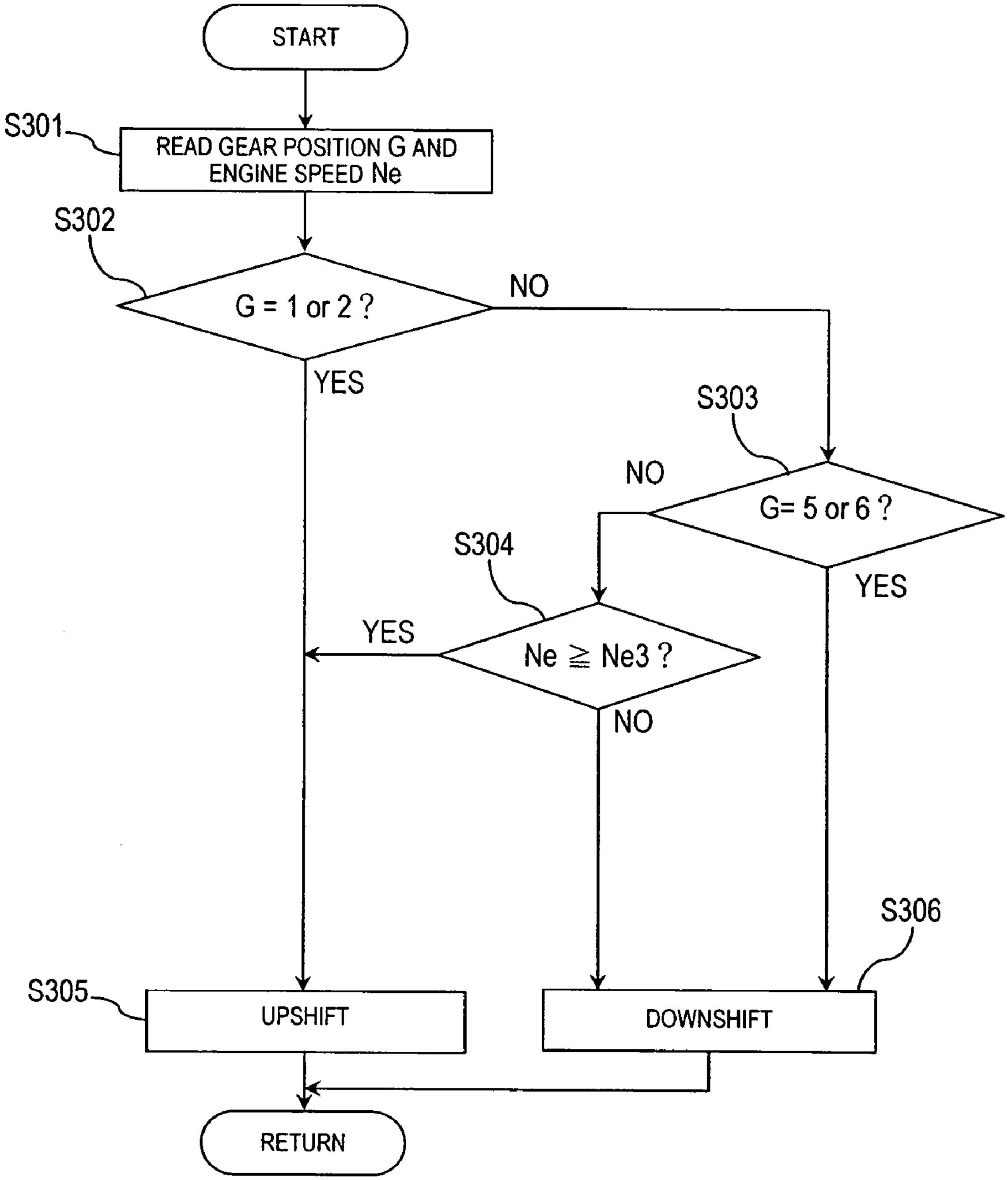
FIG. 7 is a flowchart illustrating the processing executed by a shift determination routine of the control unit in accordance with the third embodiment of the present invention.
Figure 8:
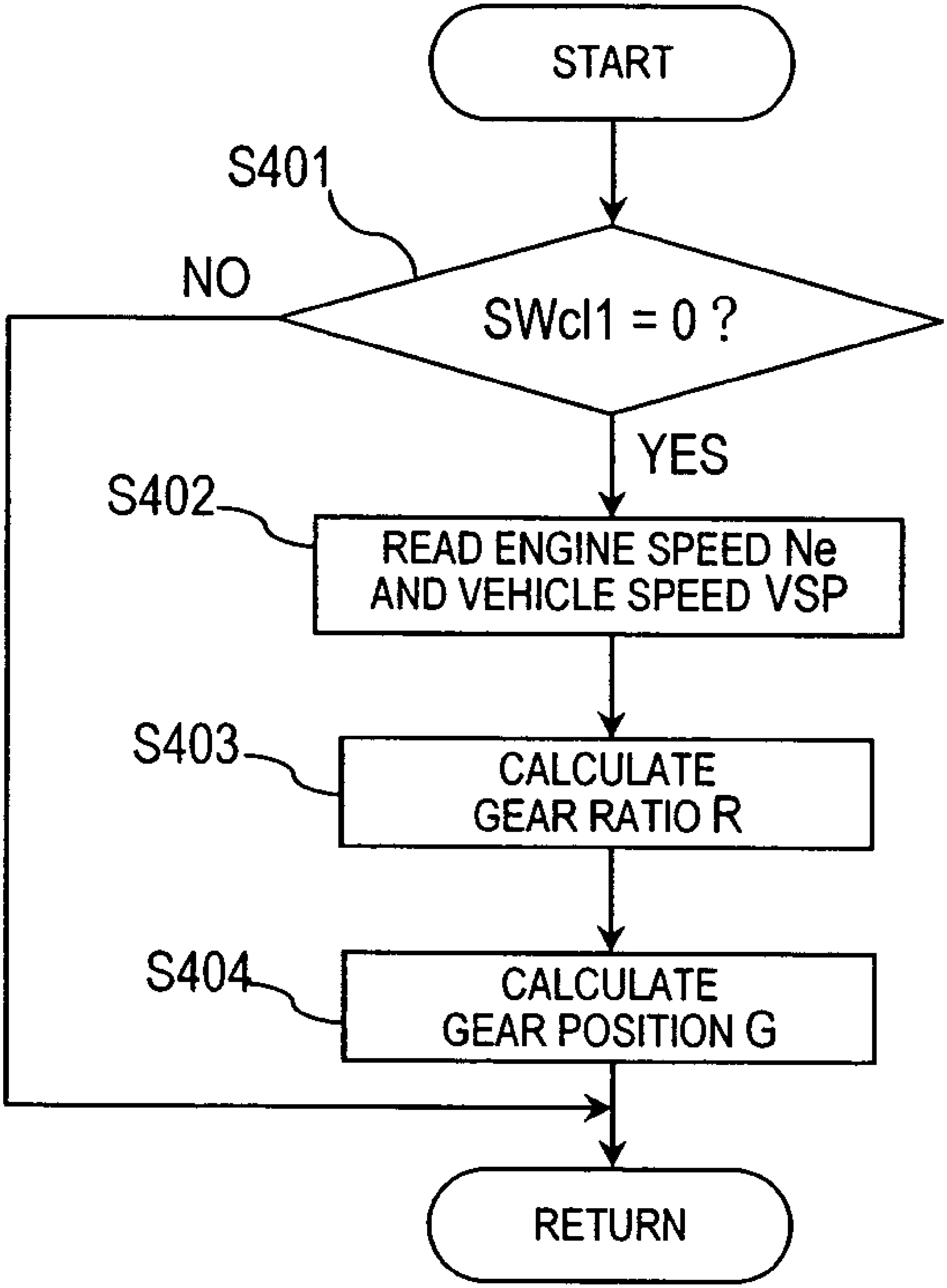
FIG. 8 is a flowchart illustrating the processing executed by a gear position detection routine of the control unit in accordance with the third embodiment of the present invention.

Referring now to FIGS. 6-8, further modified processing executed by the control unit 10 will be discussed in accordance with a third embodiment of the present invention. This third embodiment is carried out by the control unit 10 of the vehicle V that is equipped as shown in FIG. 1. In view of the similarity between the first and third embodiments, the parts or steps of the third embodiment that are identical to the parts or steps of the first embodiment will be given the same reference numerals. Moreover, the descriptions of the parts or steps of the third embodiment that are identical to the parts or steps of the first embodiment may be omitted for the sake of brevity. In other words, unless otherwise specified, the processing executed by the control unit 10 in the third embodiment is the same as the first embodiment. Thus, the modified processing will now be discussed.

With the third embodiment of the present invention, the engine control unit 10 controls the fuel being supply to the injectors of the engine 1 to improve shifting. In particular, when the fuel cut-off condition is met and it is detected that a shift is in progress, the delay time for actually stopping the supply of fuel is varied according to the direction of the shift operation. Accordingly, this delay time is shorter during an upshift and longer during a downshift, so the decrease in engine speed by fuel cut-off is faster during an upshift, while the decrease in engine speed can be suppressed by continuing the supply of fuel during a downshift, which affords quick and easy adjustment of engine speed and makes faster shifts possible, during both upshifts and downshifts.

The operation of the control unit 10 of this third embodiment will now be described through reference to the flowchart shown in FIG. 6, which is a flowchart of the fuel injection quantity calculation routine. This fuel injection quantity calculation routine is actuated by turning on the ignition switch, and is executed at specific time intervals thereafter. The fuel injection quantity Qf of the injectors are set in this routine.

In step S10, the operating state of the engine 1 is read by the control unit 10. In other words, the control unit 10 reads the detection signals which include, but not limited to the signals mentioned above, e.g., the accelerator pedal position APO, the engine speed Ne, the cooling water temperature Tw, and so forth.

In step S20, the fuel injection quantity Qf is calculated on the basis of the operating state of the engine 1 read in the previous step. The fuel injection quantity Qf is preferably calculated by referring to a prestored fuel injection quantity map in which the base fuel injection quantities Qfbase are allocated according to the accelerator pedal opening APO and the engine speed Ne. Upon calculating the Qfbase corresponding to the read APO and Ne, the calculated Qfbase is corrected according to the cooling water temperature Tw, and this corrected value thus obtained is setting as the fuel injection quantity Qf.

In step S30, the control unit 10 determines whether or not a fuel cut-off flag Fcut is set to 0. If the fuel cut-off flag Fcut is set to 0, then the routine proceeds to step S110. However, if fuel cut-off flag Fcut is not set to 0, then the routine proceeds to step S40. The fuel cut-off flag Fcut is usually set to 0, and is switched to 1 when the control unit 10 determines in the fuel cut-off routine (discussed below) that the specific fuel cut-off condition has been met.

In step S40, the clutch pedal switch signal SWcl1 is read, and the control unit 10 determines whether or not the read value of SWcl1 is 1. If the clutch pedal switch signal SWcl1 is set to 1, then the routine proceeds to step S45 to determine if a shift operation is occurring, and otherwise proceeds to step S60. The clutch pedal switch signal SWcl1 is set to 1 when the clutch pedal 8 has been depressed and the clutch 2 is fully disengaged, and all other times is set to 0. Thus, the control unit 10 receives the clutch pedal switch signal SWcl1 from the first clutch pedal switch or sensor 25. Step S40 together with the first clutch pedal switch or sensor 25 constitute an engagement or disengagement detection section.

In step S45, shift determination is performed, and it is determined whether the shift being performed is an upshift to a higher gear or a downshift to a lower gear. If it is an upshift, then the routine proceeds to step S50, and if it is a downshift, then the routine proceeds to step S60. The details of this shift determination are described below through reference to the flowchart shown in FIG. 7.

In step S50, a specific prescribed value CNT1, which determines the length of the delay time of the cut-in delay, is set to a first value a1 (which determines the length of a "first delay time"). The first value a1 is set smaller than a second value a2 (discussed next).

In step S60, the specific prescribed value CNT1 is set to the second value a2 (which determines the length of a "second delay time" or "third delay time") that is larger than the first value a1.

In step S70, the count value CNT is incremented by one. This count value CNT indicates the elapsed time since the fuel cut-off condition was met and the fuel cut-off flag Fcut was switched to 1.

In step S80, the control unit 10 determines whether or not the incremented CNT has reached the specific prescribed value CNT1. If the incremented CNT has reached the specific prescribed value CNT1, the control unit 10 determines that the specific delay time determined by the value CNT1 has elapsed since the fuel cut-off condition was met, so the routine proceeds to step S90, but if the specific prescribed value CNT1 has not been reached, then the routine proceeds to step S110.

In step S90, the count value CNT is set to 0.

In step S100, the fuel injection quantity Qf is set to 0 in order to stop the supply of fuel to the engine 1.

In step S110, the fuel injection quantity Qf set as above is termed the output injection quantity Qfset, and a drive pulse Ti whose width corresponds to this output injection quantity Qfset is outputted to the injectors. The injectors are driven by this drive pulse Ti, and fuel is supplied to the engine 1 in the output injection quantity Qfset.

In this embodiment, the control unit 10 executes the fuel cut-off routine of the flowchart shown in FIG. 3 as discussed above. This fuel cut-off routine is actuated by turning on the ignition switch, and is executed at specific time intervals thereafter. The fuel cut-off determination flag Fcut is set in this routine as discussed above.

FIG. 7 is a flowchart of the shift determination routine. This routine is executed just once at first, when the first clutch pedal switch 25 is ON (step S40 of FIG. 6) and the routine has proceeded to step S45 in the previous fuel injection quantity calculation routine. In this routine, when the clutch pedal 8 has been depressed, the control unit 10 determines whether the shift being performed is an upshift or a downshift. In this embodiment, the manual transmission 3 allows for shifts between $1^{st}$ and "n" gear positions (n=6, for example), and the larger is the number "n" that indicates the gear position, the lower is the gear ratio, and a shift is made to a higher gear.

In step S301, the gear position G and the engine speed Ne are read.

In step S302, the control unit 10 determines whether or not the current gear position is first or second gear on the basis of G read above. If it is first or second gear, then the routine proceeds to step S305, and if it is any other gear position, then the routine proceeds to step S303.

In step S303, the control unit 10 determines whether or not the current gear position is fifth or sixth gear on the basis of G read above. If it is fifth or sixth gear, then the routine proceeds to step S306, and if it is any other gear position (that is, if it is third or fourth gear), then the routine proceeds to step S304.

In step S304, the control unit 10 determines whether or not the read Ne is greater than or equal to a specific prescribed value Ne3. If it is, then the routine proceeds to step S305, but if it is less than Ne3, then the routine proceeds to step S306.

In step S305, the control unit 10 determines whether the shift being performed is an upshift.

In step S306, the control unit 10 determines whether the shift being performed is a downshift.

FIG. 8 is a flowchart of the gear position detection routine. This routine is actuated by turning on the ignition switch, and is executed at specific time intervals thereafter. The gear position G is detected in this routine.

In step S401, a clutch pedal switch signal SWcl1 is read, and it is determined whether or not the read value of SWcl1 is 0. If the clutch pedal switch signal SWcl1 is set to 1, then the routine proceeds to step S402, and otherwise this routine is concluded.

In step S402, the engine speed Ne and vehicle speed VSP are read. In this embodiment, the vehicle speed VSP is detected on the basis of the rotating speed of the output shaft of the transmission 3.

In step S403, the gear ratio R of the transmission 3 is calculated from the following equation on the basis of the read Ne and VSP.

$$R=Ne/VSP \tag{1}$$

In step S404, the gear position G is calculated on the basis of R calculated above. The gear ratio R is directly correlated to the gear position G, and at a given gear position G, the calculated R will always have the same value.

The time chart of Figure can be used to describe the fuel cut-off by cut-in delay pertaining to this embodiment. FIG. 4 is a time chart of the fuel injection quantity Qf and so forth with a cut-in delay.

When the accelerator pedal 9 has fully returned and the idle switch 27 is switched ON (time t1), the fuel cut-off flag Fcut is switched to 1 and the count value CNT is incremented by one on the condition that the engine speed Ne is in the fuel cut-off execution speed range determined by the specific prescribed value Ne1 or $Ne_{cut}$. The specific prescribed value CNT1 that determines the length of the delay time in the cut-in delay is set to the relatively large second value a2 during deceleration when the first clutch pedal switch 25 is not ON. On the other hand, during shifting when the first clutch pedal switch 25 is ON, the control unit 10 determines whether the shift being performed is an upshift or a downshift on the basis of the engine speed Ne and the gear position G, and the specific prescribed value CNT1 is switched according to the result thereof. The delay time (=CNT1) is set to the first value a1 in the former case, and to the second value a2, which is larger than the first value a1, in the latter case. The supply of fuel is continued and the decrease in the engine speed Ne is thereby suppressed until the count value CNT reaches the specific prescribed value CNT1 after the fuel cut-off flag Fcut has been switched to 1. Once the count value CNT reaches the specific prescribed value CNT1 (times t3 and t4), the fuel injection quantity Qf is set to 0 regardless of the operating state, which results in the stoppage of the supply of fuel to the engine 1 and a sudden decrease in the engine speed Ne. After this, the fuel cut-off flag Fcut is set to 0 and the supply of fuel is restarted when the accelerator pedal 9 is depressed again upon completion of a shift, etc., or when the engine speed Ne reaches a fuel cut-off recover speed range determined by the specific prescribed value Ne2 or $Ne_{rcv}$.

Now the validity of the shift determination pertaining to this embodiment will be discussed. When the current gear position is first or second gear, the control unit 10 determines that the shift being made is an upshift (step S302). This is because if the current gear position is first gear, an upshift is the only conceivable option, and if the current gear position is second gear, since it would be highly unusual for a downshift to be made from second gear to first gear, it can be considered that an upshift is being performed. Also, when the current gear position is fifth or sixth gear, the control unit 10 determines that the shift being performed is a downshift (step S303). This is because if the current gear position is sixth gear, a downshift is the only conceivable option. If the current gear position is fifth gear, although it is possible that an upshift to sixth gear is being performed, the probability thereof is much lower than in the case of a downshift. Even if the determination is in error, only a small decrease in the engine speed Ne is required in an upshift from fifth gear, so even though continuing the supply of fuel during an upshift may result in a less than perfect match with the optimal post-shift engine speed as the clutch 2 is engaged, the speed differential is small, and the gear ratio is also small, so very little shock (lurching in this case) is generated, and a mistaken determination will have little effect. Further, when the current gear position is third or fourth gear, the direction of the shift is determined according to the engine speed Ne. It is then determined that an upshift is being performed when the engine speed is in a high range (greater than or equal to the specific prescribed value Ne3), and a downshift is being performed when the engine speed is in a lower range (step S304). This is because when the current gear position is third or fourth gear, if the shift is made at a high engine speed, it is possible that an upshift is being performed because of rapid acceleration, and even if the determination at a low engine speed is mistaken, only a small decrease in the engine speed Ne is required in an upshift at low engine speed, so there will be no significant lurching sensation.

The shift determination can be carried out at higher accuracy by applying fuzzy logic that takes into account the history of driver-side information (such as accelerator pedal opening, gear position, and brake switch signal) and vehicle-side information (such as engine speed, vehicle speed, and acceleration).

Also, in this embodiment, the gear ratio R was calculated on the basis of the engine speed Ne and the vehicle speed VSP, and the gear position G was detected from the correlation to the calculated R. This allows cost increases to be kept to a minimum. However, if the vehicle is equipped with a shift lever sensor for detecting the position of the shift lever operated by the driver for shifting, the gear position G can be easily and effectively detected on the basis of the output signal from this shift lever sensor.

Also, in this embodiment, the shift determination was concluded prior to operation of the shift lever, at the point when the first clutch pedal switch 25 was switched ON, on the basis of the engine speed Ne and the gear position G. However, with the present invention, it is also possible to determine the direction of the shift operation by detecting the gear position before and after the shift, which eliminates erroneous determinations, although the decrease in the engine speed Ne will be slower by an amount equal to the time from the disengagement of the clutch 2 until the shift lever enters its post-shift position.

In this embodiment, step S40 in the flowchart shown in FIG. 6 constitutes the clutch disengagement detection section or shifting detection section, the flowcharts shown in FIGS. 7 and 8 constitute the shifting determination section, step S202 to step S204 in the flowchart shown in FIG. 3 constitute the fuel cut-off determination section, and step S50 to step S100 in the flowchart shown in FIG. 6 constitute the fuel supply stoppage section.

The following effects are obtained with this embodiment.

First, in this embodiment, when the fuel cut-off condition has been met and the first clutch pedal switch 25 is ON (that is, during a shift), the length of the delay time in cut-in delay is varied according to the direction of the shift operation. In this embodiment, the delay time is set shorter during an upshift, and longer during a downshift. Accordingly, during an upshift the decrease in engine speed is accelerated by fuel cut-off (B1 in FIG. 4), and during a downshift the decrease in engine speed can be suppressed by continuing the supply of fuel even after the disengagement of the clutch (B3 in FIG. 4), so engine speed can be adjusted quickly and easily, and shifts can be performed faster, during both upshifts and downshifts.

Second, in this embodiment, when the fuel cut-off condition has been met, the length of the delay time is varied according to whether the first clutch pedal switch 25 is ON or OFF. During shifting in the former case, and particularly during an upshift, shifts can be made smoothly and quickly by performing cut-in delay with the delay time set shorter, and during shifting in the latter case, a sudden reduction in engine torque can be prevented, and the occurrence of a jerking sensation can be suppressed, by performing cut-in delay with the delay time set longer.

Third, an engine inhibitor switch, with which manual transmission vehicles are commonly equipped, is employed as the first clutch pedal switch 25 in this embodiment, so the additional cost entailed by implementing the present invention can be kept to a minimum.

The example given above was for a case in which the supply of fuel was continued to a certain extent even after the clutch 2 was disengaged, both when an upshift occurs and when a fuel cut-off condition was met. This prevents the occurrence of a jerking sensation upon re-engagement when the clutch 2 is accidentally disengaged even though the driver does not intend to shift gears because the supply of the fuel does not stop immediately. With the present invention, however, it is also possible to stop the supply of fuel as soon as the clutch 2 has been disengaged after the fuel cut-off condition is met, so that the engine speed Ne will decrease even more quickly during an upshift.

Fourth Embodiment

Figure 9:
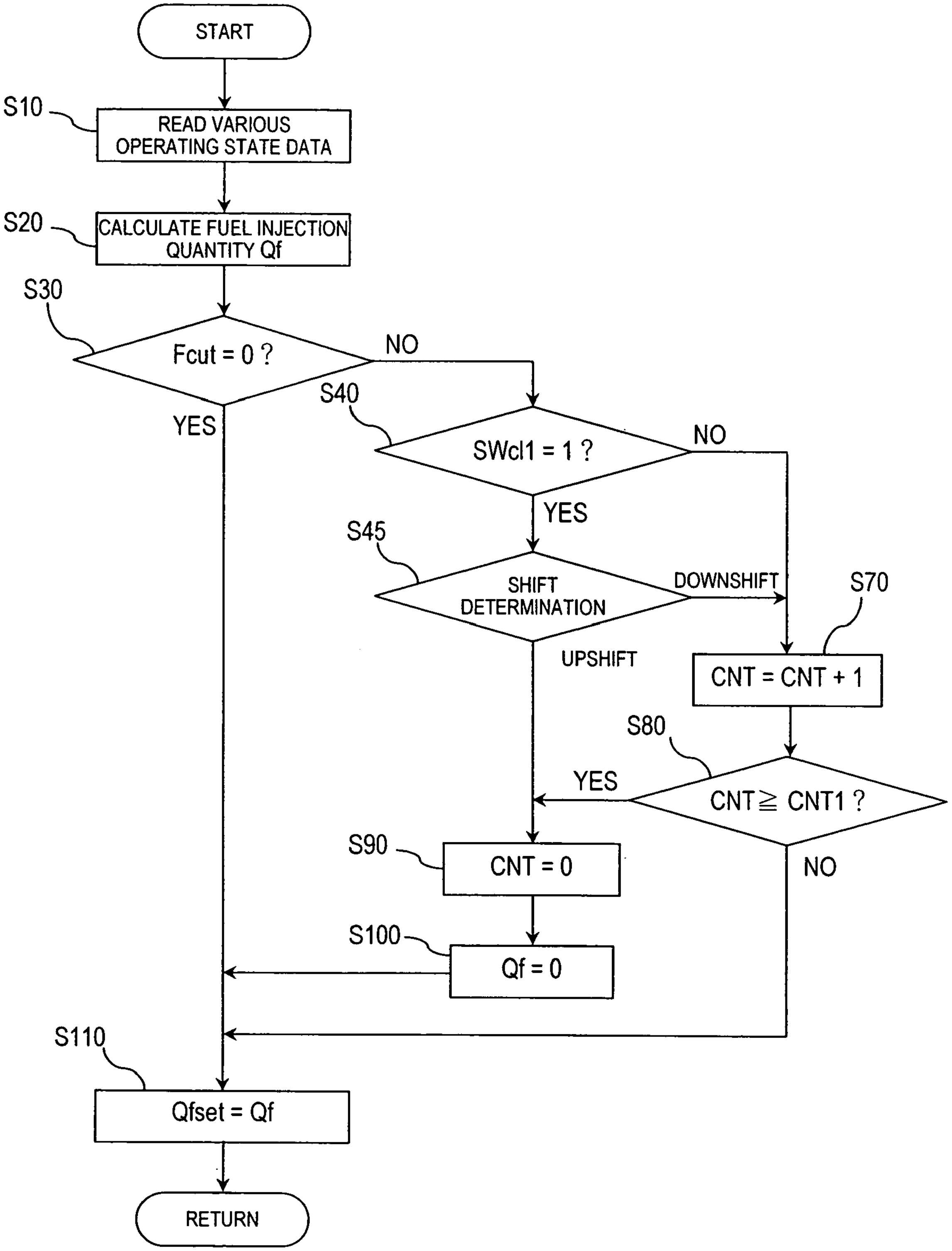
FIG. 9 is a flowchart illustrating the processing executed by a fuel injection quantity calculation routine of the control unit accordance with a fourth embodiment of the present invention.

Referring now to FIG. 9, further modified processing executed by the control unit 10 will be discussed in accordance with a fourth embodiment of the present invention. This fourth embodiment is carried out by the control unit 10 of the vehicle V that is equipped as shown in FIG. 1. In view of the similarity between the fourth embodiment and the prior embodiments, the parts or steps of the fourth embodiment that are identical to the parts or steps of the prior embodiments will be given the same reference numerals. Moreover, the descriptions of the parts or steps of the fourth embodiment that are identical to the parts or steps of the prior embodiments may be omitted for the sake of brevity. In other words, unless otherwise specified, the processing executed by the control unit 10 in the fourth embodiment is the same as the prior embodiments. Thus, the modified processing will now be discussed.

The operation of the control unit 10 of this fourth embodiment will now be described through reference to the flowchart shown in FIG. 9, which is a flowchart of the fuel injection quantity calculation routine in which the supply of fuel is stopped as soon as the clutch is disengaged during an upshift. This fuel injection quantity calculation routine is actuated by turning on the ignition switch, and is executed at specific time intervals thereafter. The fuel injection quantity Qf of the injectors are set in this routine. In FIG. 9, the steps that perform the same actions as in the previous embodiment are given the same reference number as in the flowcharts shown in FIGS. 2, 5 and 6.

In step S10, the operating state of the engine 1 is read by the control unit 10. In other words, the control unit 10 reads the detection signals which include, but not limited to the signals mentioned above, e.g., the accelerator pedal position APO, the engine speed Ne, the cooling water temperature Tw, and so forth.

In step S20, the fuel injection quantity Qf is calculated on the basis of the operating state of the engine 1 read in the previous step. After which the calculated Qf is set to the output injection quantity Qfset (step S110) when the fuel cut-off flag Fcut is determined to be set to 0 in step S30. Meanwhile, if the fuel cut-off flag Fcut determined to be set to 1 in step S30, then the routine proceeds to step S40. In step S40, the control unit 10 determines whether or not the first clutch pedal switch 25 is ON. If the first clutch pedal switch 25 is ON, then the routine proceeds to step S45. If the shift being performed is an upshift, the supply of fuel is immediately stopped (steps S90 and S100). If, however, the first clutch pedal switch 25 is OFF, or, even if the first clutch pedal switch 25 is ON but a downshift is being performed, then the routine proceeds to steps S70 and S80, where it is determined whether or not the specific delay time (=CNT1) has elapsed, and until such time, the supply of fuel is continued. Once this time has elapsed, the supply of fuel is stopped (steps S90 and S100).

In this embodiment, step S40 in the flowchart shown in FIG. 9 constitutes the clutch disengagement detection section or shifting detection section, and step S45, S70 to step S100 in the same flowchart constitute the fuel supply stoppage section. The flowcharts shown in FIGS. 7 and 8 constitute the shift determination section, step S202 to step S204 in the flowchart shown in FIG. 3 constitutes the fuel cut-off determination section, which is the same as above.

With this embodiment, the following effects are obtained in addition to the first and second effects discussed above of the third embodiment.

Specifically, in this fourth embodiment, when it is detected that the clutch 2 is disengaged after the fuel cut-off condition has been met, unless the shift being performed is an upshift, the fuel injection quantity Qf is set to 0 (A2 in FIG. 4) along with the disengagement of the clutch 2, and the supply of fuel is immediately stopped. During an upshift, when the supply of fuel is continued after though the clutch 2 is disengaged, disengagement of the clutch 2 may result in revving of the engine 1, in which there is a significant increase in the engine speed Ne, so that it takes longer to adjust to the optimal engine speed after shifting (B4 in FIG. 4), but this revving of the engine 1 can be avoided by immediately stopping the supply of fuel, so shifts can always be made faster than in the previous embodiment.

Fifth Embodiment

Figure 10:
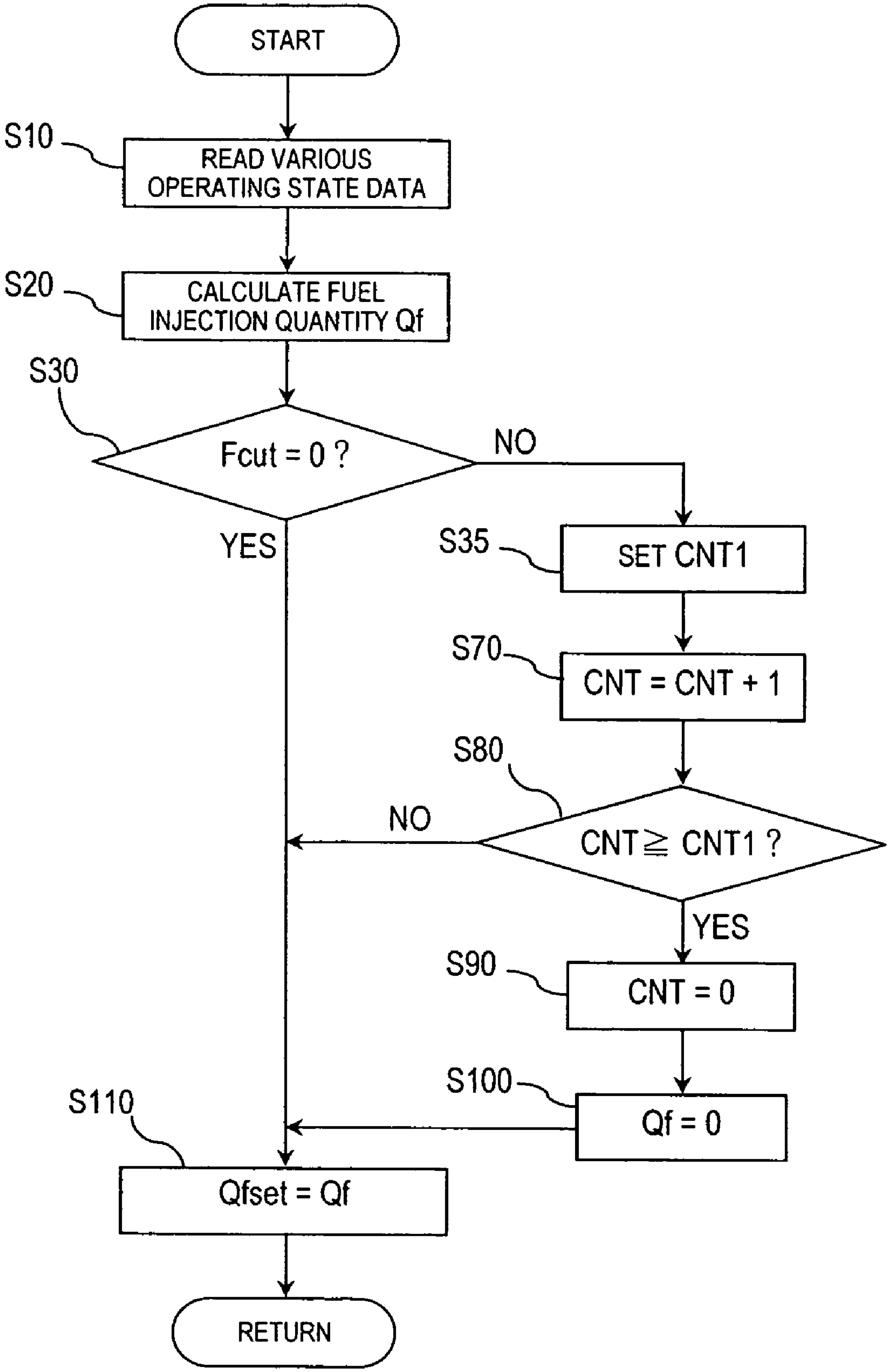
FIG. 10 is a flowchart illustrating the processing executed by a fuel injection quantity calculation routine of the control unit accordance with a fifth embodiment of the present invention.
Figure 11:
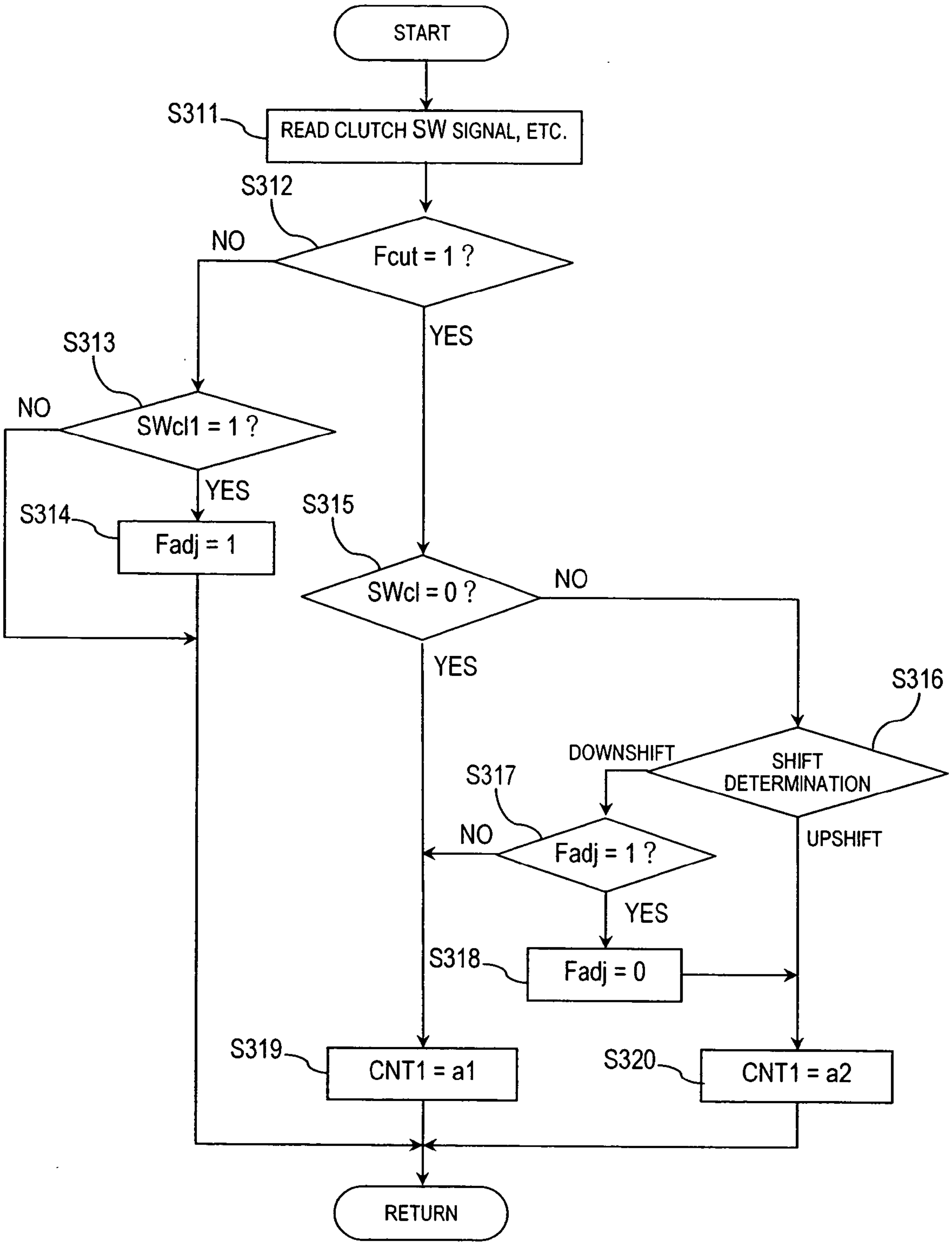
FIG. 11 is a flowchart illustrating the processing executed by a delay time setting routine of the control unit accordance with the fifth embodiment of the present invention.
Figure 12:
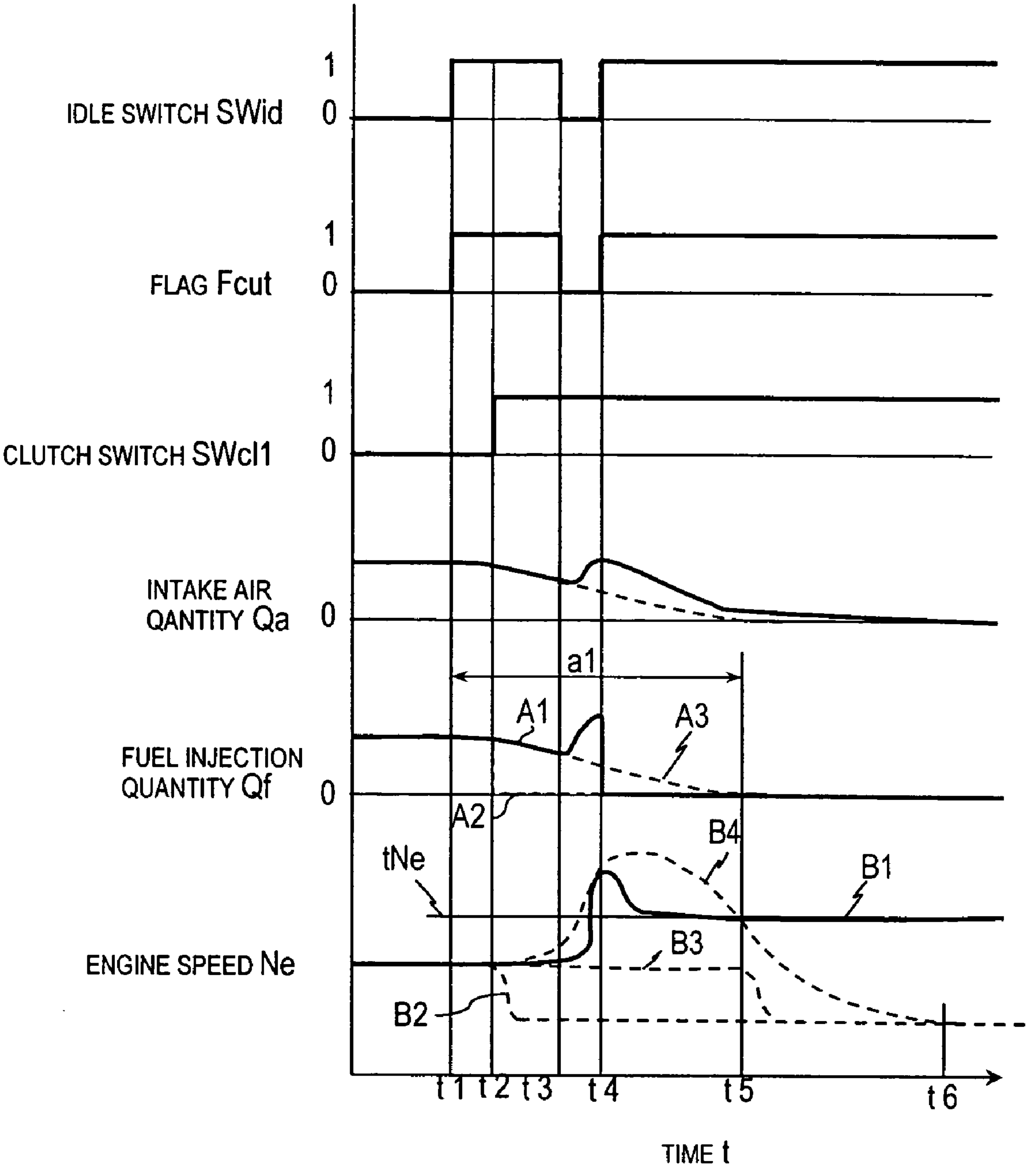
FIG. 12 is a time chart illustrating the changes in fuel injection quantity and other parameters during fuel cut-off by the engine fuel supply control device in accordance with the fifth embodiment of the present invention.

Referring now to FIGS. 10-12, further modified processing executed by the control unit 10 will be discussed in accordance with a fifth embodiment of the present invention. This fifth embodiment is carried out by the control unit 10 of the vehicle V that is equipped as shown in FIG. 1. In view of the similarity between the prior embodiments and this fifth embodiment, the parts or steps of the fifth embodiment that are identical to the parts or steps of the prior embodiments will be given the same reference numerals. Moreover, the descriptions of the parts or steps of the fifth embodiment that are identical to the parts or steps of the prior embodiments may be omitted for the sake of brevity. In other words, unless otherwise specified, the processing executed by the control unit 10 in the fifth embodiment is the same as the prior embodiments. Thus, the modified processing will now be discussed.

With the fifth embodiment of the present invention, the engine control unit 10 controls the fuel being supply to the injectors of the engine 1. In particular, when the fuel cut-off condition is met and it is detected that the clutch 2 has been disengaged (that is, that a shift is in progress), the delay time for actually stopping the supply of fuel is varied according to the time relationship between clutch disengagement and the meeting of the fuel cut-off condition in a single operation from the engagement to the disengagement of the clutch 2. Accordingly, with the present invention, when the disengagement of the clutch 2 comes first, the delay time is made shorter than when the meeting of the fuel cut-off condition comes first, which allows the engine speed to be decreased faster after the optimal post-shift speed has been exceeded when the shift being performed is a downshift, so that the driver can quickly and effectively adjust the engine speed during a downshift, and can make a shift faster.

The operation of the control unit 10 of this fifth embodiment will now be described through reference to the flowchart shown in FIG. 10, which is a flowchart of the fuel injection quantity calculation routine. This fuel injection quantity calculation routine is actuated by turning on the ignition switch, and is executed at specific time intervals thereafter. The fuel injection quantity Qf of the injectors are set in this routine.

In step S10, the operating state of the engine 1 is read by the control unit 10. In other words, the control unit 10 reads the detection signals which include, but not limited to the signals mentioned above, e.g., the accelerator pedal position APO, the engine speed Ne, the cooling water temperature Tw, and so forth.

In step S20, the fuel injection quantity Qf is calculated on the basis of the operating state of the engine 1 read in the previous step. The fuel injection quantity Qf is preferably calculated by referring to a prestored fuel injection quantity map in which the base fuel injection quantities Qfbase are allocated according to the accelerator pedal opening APO and the engine speed Ne. Upon calculating the Qfbase corresponding to the read APO and Ne, the calculated Qfbase is corrected according to the cooling water temperature Tw, and this corrected value thus obtained is setting as the fuel injection quantity Qf.

In step S30, the control unit 10 determines whether or not a fuel cut-off flag Fcut is 0. If the fuel cut-off flag Fcut is set to 0, then the routine proceeds to step S110. However, if fuel cut-off flag Fcut is not set to 0, then the routine proceeds to step S35. The fuel cut-off flag Fcut is usually set to 0, and is switched to 1 when it is determined in the fuel cut-off routine (discussed below) that the specific fuel cut-off condition has been met (see FIG. 11).

In step S35, a specific prescribed value CNT1, which determines the delay time of the fuel cut-off, is set. This specific prescribed value CNT1 is set in the delay time setting routine (FIG. 11) discussed below. Then the routine proceeds to step S70.

In step S70, the count value CNT is incremented by one. This count value CNT indicates the elapsed time since the fuel cut-off condition was met and the fuel cut-off flag Fcut was switched to 1. Then, then the routine proceeds to step S80.

In step S80, the control unit 10 determines whether or not the incremented CNT has reached a specific prescribed value CNT1. If the incremented CNT has reached the specific prescribed value CNT1, the control unit 10 determines that the specific delay time determined by the value CNT1 has elapsed since the fuel cut-off condition was met, so the routine proceeds to step S90, but if this value has not been reached, then the routine proceeds to step S110. The magnitude of the specific prescribed value CNT1 is switched in a delay time setting routine (discussed below) between a relatively large first value 1 a and a second value a2 that is smaller than this first value a1.

In step S90, the count value CNT is set to 0.

In step S100, the fuel injection quantity Qf is set to 0 in order to stop the supply of fuel to the engine 1.

In step S110, the fuel injection quantity Qf set as above is termed the output injection quantity Qfset, and a drive pulse Ti whose width corresponds to this output injection quantity Qfset is outputted to the injectors. The injectors are driven by this drive pulse Ti, and fuel is supplied to the engine 1 in the output injection quantity Qfset.

In this embodiment, the control unit 10 executes the fuel cut-off routine of the flowchart shown in FIG. 3 as discussed above. This fuel cut-off routine is actuated by turning on the ignition switch, and is executed at specific time intervals thereafter. The fuel cut-off determination flag Fcut is set in this routine.

FIG. 11 is a flowchart of the delay time setting routine. This routine is actuated by turning on the ignition switch, and is executed at specific time intervals thereafter. The magnitude of the specific prescribed value CNT1 is set in this routine.

In step S311, a clutch pedal switch signal SWcl1 and so forth are read.

In step S312, the control unit 10 determines whether or not the value of the fuel cut-off flag Fcut is 1. If the value of the fuel cut-off flag Fcut is 1, then the routine proceeds to step S315, and if the value of the fuel cut-off flag Fcut is not 1, then the routine proceeds to step S313.

In step S313, the control unit 10 determines whether or not the read value of SWcl1 is 1. If the read value of SWcl1 is 1, then the routine is concluded via step S314. However, if the read value of SWcl1 is not 1, then the routine is concluded directly. The clutch pedal switch signal SWcl1 is set to 1 when the clutch pedal 8 is depressed and the clutch 2 has been completely disengaged. Otherwise, the clutch pedal switch signal SWcl1 is set to 0.

In step S314, an engine speed adjustment flag Fadj is set to 1. This engine speed adjustment flag Fadj indicates that fuel cut-off has been temporarily halted in order to match the engine speed Ne to the optimal post-shift speed, and if the value of the fuel cut-off flag Fcut being 0 is due to this temporary halting (step S312), the setting is changed to 1 in this step.

In step S315, the control unit 10 determines whether or not the read value of SWcl1 is 0. If the value of the clutch pedal switch signal SWcl1 is 0, then the routine proceeds to step S319. However, if the value of the clutch pedal switch signal SWcl1 is not 0, then the routine proceeds to step S316.

In step S316, the shift determination is performed, and it is determined whether or not the shift being performed is an upshift or a downshift. If it is an upshift, then the routine proceeds to step S320, and if it is a downshift, then the routine proceeds to step S317. This shift determination procedure is the same as the shift determination procedure described above with reference to the flowchart shown in FIG. 7.

In step S317, the control unit 10 determines whether or not the value of the engine speed adjustment flag Fadj is 1. If the value is 1, it is concluded that this fuel cut-off is due to re-determination accompanying the adjustment of the engine speed Ne, and the routine proceeds to step S318, but if the value is not 1, then the routine proceeds to step S319.

In step S318, the engine speed adjustment flag Fadj is set to 0.

In step S319, the specific prescribed value CNT1 (which corresponds to the first and fourth delay times) is set to the first value a1.

In step S320, the specific prescribed value CNT1 (which corresponds to the second or third delay times) is set to the second value a2 (<a1). In this embodiment, we will assume that this second value a2 is 0.

In this embodiment, the control unit 10 executes the shift determination routine of the flowchart in FIG. 7 as discussed above in the third embodiment. Thus, the shift determination routine of the flowchart in FIG. 7 is executed when the first clutch pedal switch 25 is ON (step S315) and the routine has proceeded to step S316 in the previous delay time setting routine. In this routine, when the clutch pedal 8 has been depressed, the control unit 10 determines whether the shift being performed is an upshift or a downshift. In this embodiment, the transmission 3 allows for shifts between 1 and "n" gear positions (n=6, for example), and the larger is the number "n" that indicates the gear position, the lower is the gear ratio, and a shift is made to a higher gear.

The basis of using the shift determination in this embodiment will now be discussed. When the current gear position is first or second gear, the control unit 10 determines that the shift being made is an upshift (step S302). This is because if the current gear position is first gear, an upshift is the only conceivable option, and if the current gear position is second gear, since it would be highly unusual for a downshift to be made from second gear to first, it can be considered that an upshift is being performed. Also, when the current gear position is fifth or sixth gear, the control unit 10 determines that the shift being performed is a downshift (step S303). This is because if the current gear position is sixth gear, a downshift is the only conceivable option. If the current gear position is fifth gear, although it is possible that an upshift to sixth gear is being performed, the probability thereof is much lower than in the case of a downshift. Even if the determination is in error, only a small decrease in the engine speed Ne is required in an upshift from fifth gear, so even though continuing the supply of fuel during an upshift may result in a less than perfect match with the optimal post-shift engine speed as the clutch 2 is engaged, the speed differential is small, and the gear ratio is also small, so very little shock (lurching in this case) is generated, and a mistaken determination will have little effect. Further, when the current gear position is third or fourth gear, the direction of the shift is determined according to the engine speed Ne; it is determined that an upshift is being performed when the engine speed is in a high range (greater than or equal to the specific prescribed value Ne3), and a downshift is being performed when the engine speed is in a lower range (step S304). This is because when the current gear position is third or fourth gear, if the shift is made at a high engine speed, it is possible that an upshift is being performed because of rapid acceleration, and even if the determination at a low engine speed is mistaken, only a small decrease in the engine speed Ne is required in an upshift at low engine speed, so there will be no significant lurching sensation.

Next, a time chart will be used to describe the fuel cut-off by cut-in delay pertaining to this embodiment. FIG. 12 is a time chart of the fuel injection quantity Qf and so forth with a cut-in delay.

When the accelerator pedal 9 has fully returned and the idle switch 27 is switched ON (time t1), the fuel cut-off flag Fcut is switched to 1 and the count value CNT is incremented by one on the condition that the engine speed Ne is in the fuel cut-off execution speed range determined by the specific prescribed value Ne1 or $Ne_{cut}$. The specific prescribed value CNT1 that determines the length of the delay time in the cut-in delay is set to the relatively large first value a1 during deceleration when the first clutch pedal switch 25 is not ON. On the other hand, during shifting when the first clutch pedal switch 25 is ON, the control unit 10 determines whether the shift being performed is an upshift or a downshift on the basis of the engine speed Ne and the gear position G, and the specific prescribed value CNT1 is switched according to the result thereof. The delay time (=CNT1) is set to the second value a2 in the former case, and to the first value a1 (>a2) in the latter case. The supply of fuel is continued and the decrease in the engine speed Ne is thereby suppressed until the count value CNT reaches the specific prescribed value CNT1 after the fuel cut-off flag Fcut has been switched to 1. Once the count value CNT reaches the specific prescribed value CNT1 (times t2 and t5), the fuel injection quantity Qf is set to 0 regardless of the operating state, which results in the stoppage of the supply of fuel to the engine 1 and a sudden decrease in the engine speed Ne. At this point, if a downshift is being performed, the fuel cut-off flag Fcut is set to 0 and the fuel injection quantity Qf is increased by operation of the idle switch 27 when the accelerator pedal 9 has been depressed in order to adjust the engine speed Ne (A1 in FIG. 12). When the accelerator pedal 9 has fully returned, the idle switch 27 is turned on and the fuel cut-off flag Fcut is once again set to 1, but the value CNT1 at this point is set to the second value a2 because the engine speed adjustment flag Fadj has been set to 1 (step S317). Accordingly, since the idle switch 27 is ON and the supply of fuel is stopped (time t4), the engine speed Ne decreases quickly toward the optimal speed tNe, even though it increased excessively during adjustment. After this, the supply of fuel is restarted when the accelerator pedal 9 is depressed again upon completion of a shift, etc., or when the engine speed Ne reaches a fuel cut-off recover speed range determined by the specific prescribed value Ne2 or $Ne_{rcv}$.

In this embodiment, steps S313 and S315 in the flowchart shown in FIG. 11 constitutes the clutch disengagement detection section or shifting detection section, step S202 to step S204 in the flowchart shown in FIG. 3 constitute the fuel cut-off determination section, step S70 to step S100 in the flowchart shown in FIG. 10, the entire flowchart shown in FIG. 11 (except for step S313 and step S315) constitute the fuel supply stoppage section, and the entire flowchart shown in FIGS. 7 and 8 constitute the shift determination section.

The following effects are obtained with this fifth embodiment.

First, in this fifth embodiment, when the fuel cut-off condition has been met and the first clutch pedal switch 25 is ON (that is, when a shift is in progress), if the shift being performed is a downshift, as a rule the delay time of the cut-in delay is made longer (B3 in FIG. 12), but when the accelerator pedal 9 has been depressed in order to adjust the engine speed Ne during a downshift, the delay time until the accelerator pedal 9 is subsequently returned is made shorter (B1 in FIG. 12). Accordingly, during a downshift, as a rule the supply of fuel is continued and the decrease in engine speed Ne is suppressed even after the disengagement of the clutch 2, whereas when the engine speed Ne has risen too far during adjustment, the decrease in the engine speed Ne can be accelerated by fuel cut-off, so that the operation of the accelerator pedal 9 is directly reflected in the change in the engine speed Ne, allowing a shift to be made quickly and effectively.

Second, in this fifth embodiment, the length of the delay time in cut-in delay is changed according to the direction of the shift operation during a shift, and the delay time is made shorter during an upshift than during a downshift (B2 in FIG. 12). Accordingly, during an upshift the decrease in the engine speed Ne can be accelerated by fuel cut-off, allowing a faster shift.

Third, in this fifth embodiment, when the fuel cut-off condition has been met, the length of the delay time is changed according to whether the first clutch pedal switch 25 is ON or OFF, and the delay time is made longer in the latter case of deceleration (A3 in FIG. 12). Accordingly, sudden decreases in engine torque are prevented during deceleration, and a jerking sensation is minimized.

Fourth, in this fifth embodiment, when an engine inhibitor switch is employed as the first clutch pedal switch 25 in a manual transmission vehicle, the additional cost entailed by implementing the present invention can be kept to a minimum.

In the above, the delay time set in the adjustment of the engine speed Ne during a downshift (that is, the second delay time) was made the same length as the delay time set during an upshift (that is, the third delay time), with both being set to 0. When this is done, the engine speed Ne can be adjusted more quickly, revving of the engine 1 (B4 in FIG. 12) that accompanies disengagement of the clutch 2 is prevented, and the engine speed Ne can be decreased quickly (B2 in FIG. 12). However, with the present invention, the lengths of these delay times may be different, and in particular by making the latter delay time somewhat longer, and continuing the supply of fuel somewhat beyond the disengagement of the clutch 2, the jerking sensation that occurs during re-engagement can be prevented, without stopping the supply of fuel right away if the driver should mistakenly disengage the clutch 2.

Also, in the above, a prerequisite for setting the second delay time was that the fuel cut-off condition that was met was the same as when the vehicle is driving (step S312), but the fuel cut-off condition when the vehicle is driving may be different from the condition for stopping the supply of fuel in the adjustment of engine speed during a downshift, so that when the fuel cut-off condition is no longer met because of engine speed adjustment, the supply of fuel is stopped immediately only when the idle switch 27 is subsequently turned on.

Sixth Embodiment

Figure 13:
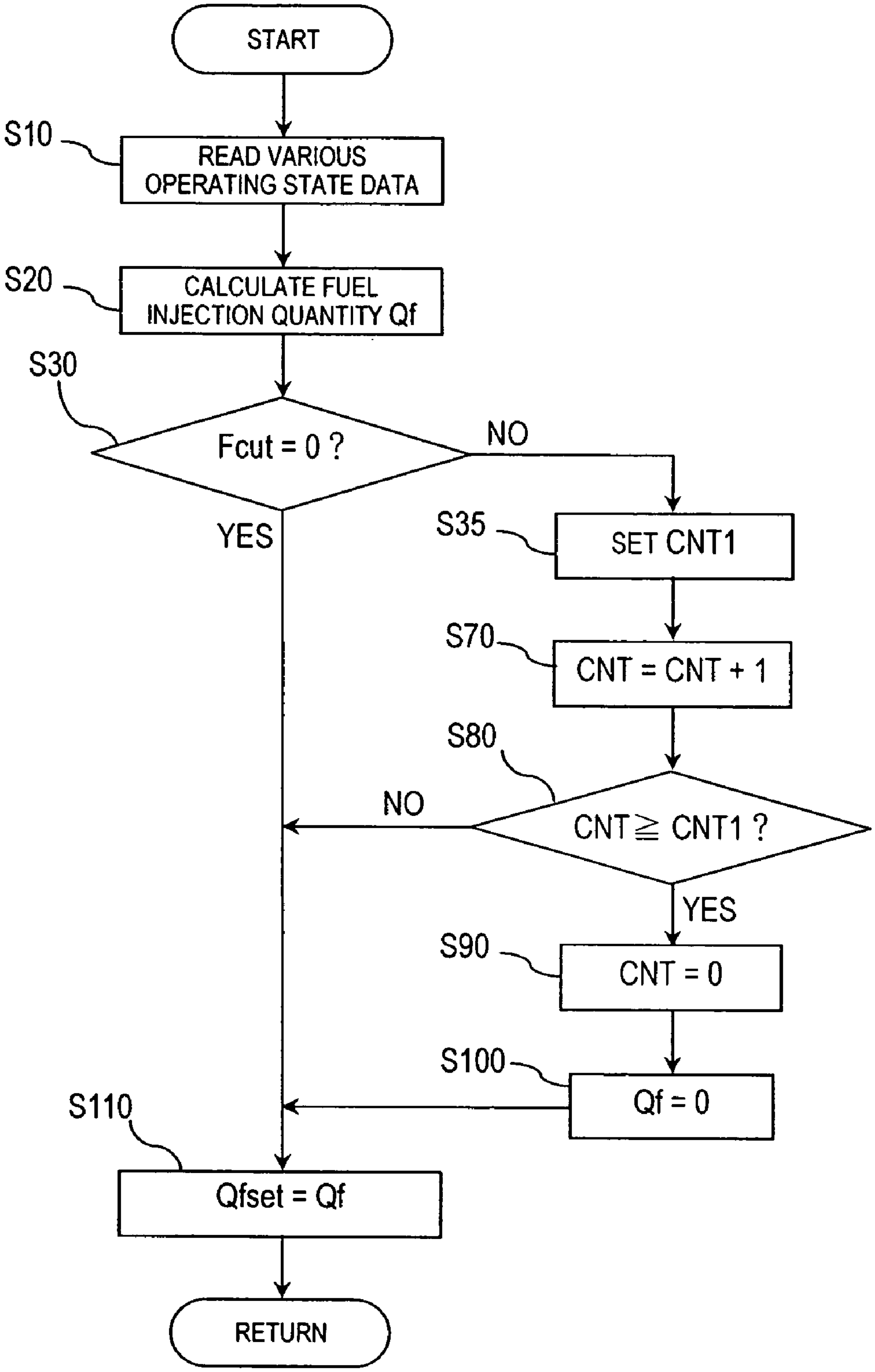
FIG. 13 is a flowchart illustrating the processing executed by a fuel injection control routine by the engine fuel supply control device in accordance with a sixth embodiment of the present invention.
Figure 14:
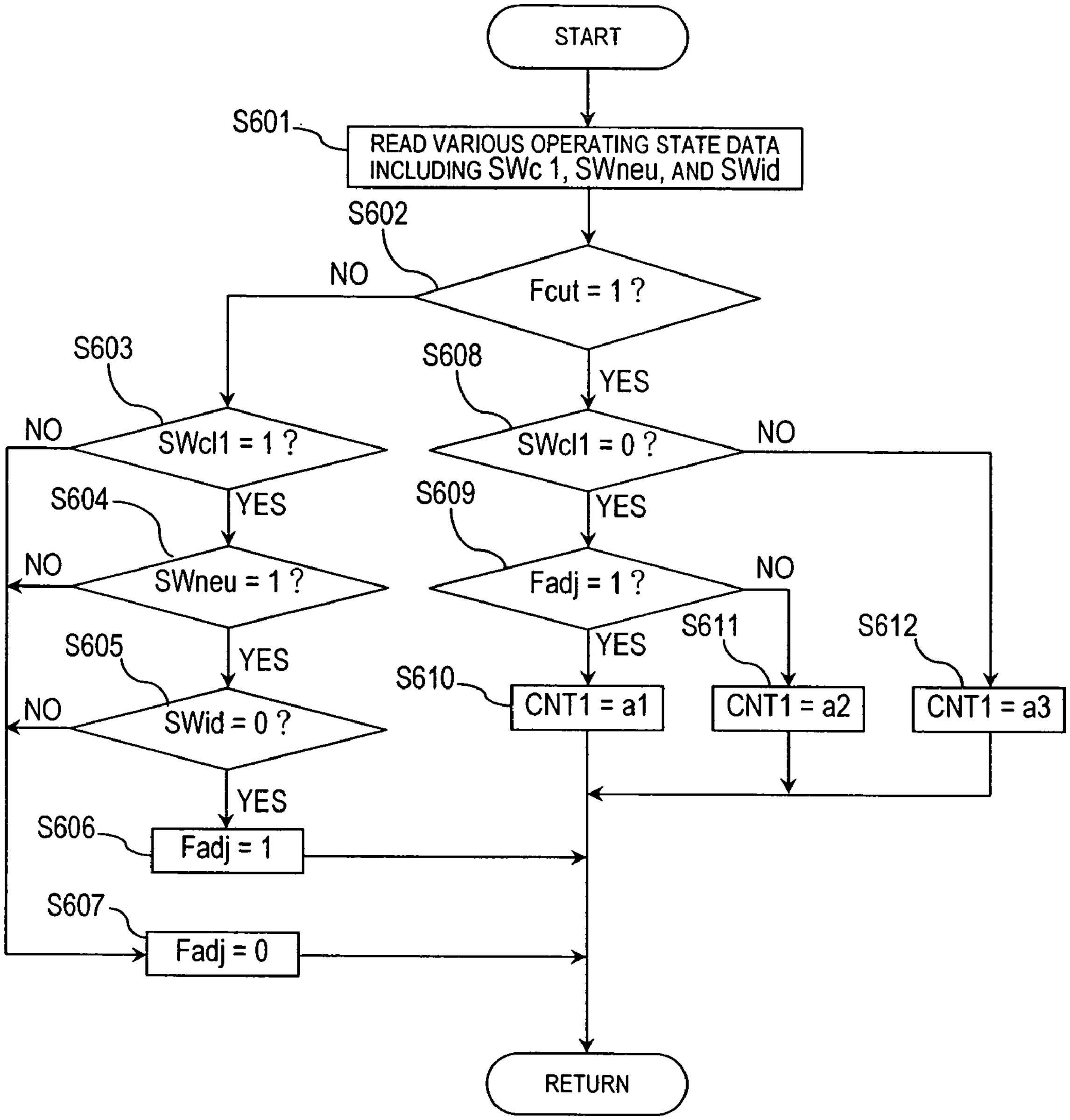
FIG. 14 is a flowchart illustrating the processing executed by a routine for setting the delay time of fuel cut-off by the engine fuel supply control device in accordance with the sixth embodiment of the present invention.
Figure 15:
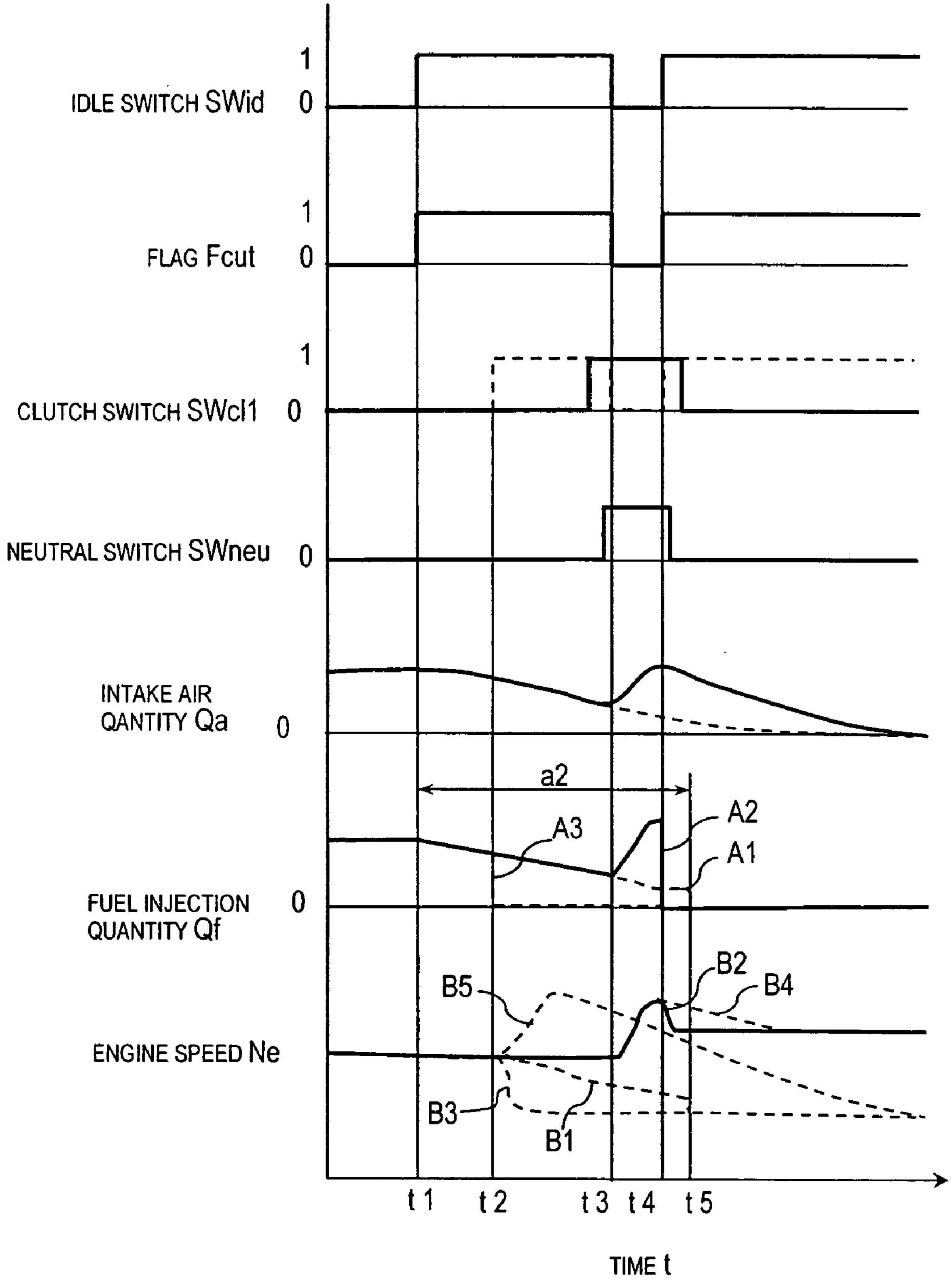
FIG. 15 is a time chart illustrating the changes in fuel injection quantity and other parameters during fuel cut-off by the engine fuel supply control device in accordance with the sixth embodiment of the present invention.

Referring now to FIGS. 13-15, further modified processing executed by the control unit 10 will be discussed in accordance with a sixth embodiment of the present invention. This sixth embodiment is carried out by the control unit 10 of the vehicle V that is equipped as shown in FIG. 1. In view of the similarity between the prior embodiments and this sixth embodiment, the parts or steps of the sixth embodiment that are identical to the parts or steps of the prior embodiments will be given the same reference numerals. Moreover, the descriptions of the parts or steps of the sixth embodiment that are identical to the parts or steps of the prior embodiments may be omitted for the sake of brevity. In other words, unless otherwise specified, the processing executed by the control unit 10 in the sixth embodiment is the same as the prior embodiments. Thus, the modified processing will now be discussed.

In this embodiment, a so-called clutch start system is employed, in which no current is sent to the starter motor (cell motor) if the ignition key (not shown) is turned to the engine start position without the clutch pedal 8 being depressed. The first clutch pedal switch 25 is used (doubles) as the above-mentioned clutch pedal switch for detecting the disengagement of the clutch 2 and for a clutch start system switch or sensor in this clutch start system.

With the sixth embodiment of the present invention, the engine control unit 10 controls the fuel being supply to the injectors of the engine 1. In particular, when the fuel cut-off condition is met and it is detected that the clutch 2 has been disengaged (that is, that a shift is in progress), the delay time for actually stopping the supply of fuel is varied. When the clutch 2 is engaged, as a general rule the supply of fuel is stopped after a relatively long delay time (second value) has elapsed since the fuel cut-off condition was met, which prevents the deceleration shock that would otherwise accompany fuel cut-off, but when the fuel cut-off condition is met after the engine speed adjustment operation has been performed, a short delay time (first value) is set even if the clutch 2 is engaged. Accordingly, although the engine speed adjustment operation has been performed so as to match to the post-shift engine speed during a downshift, even if this results in the engine speed exceeding the post-shift engine speed (going too high), the engine speed can be quickly lowered, so the deceleration shock that would accompany fuel cut-off can be prevented, and a quick downshift that is free of shock can be performed.

When the accelerator pedal 9 is depressed while the clutch 2 is engaged and the transmission 3 is in a neutral state, once the driver lifts off from the accelerator pedal 9, the supply of fuel is stopped without confirming whether or not the fuel cut-off condition has been met, so even if the engine speed rises excessively as a result of the engine speed adjustment operation performed by accelerator pedal operation during a downshift, the engine speed can be lowered quickly and a smooth downshift that is free of shock can be performed.

The operation of the control unit 10 of this sixth embodiment will now be described through reference to the flowchart shown in FIG. 13, which is a flowchart of the fuel injection quantity calculation routine or a so called fuel injection control routine. This fuel injection quantity calculation routine is actuated by turning on the ignition switch, and is executed at specific time intervals thereafter. The fuel injection quantity Qf of the injectors are set in this routine.

In step S10, the operating state of the engine 1 is read by the control unit 10. In other words, the control unit 10 reads the detection signals which include, but not limited to signals mentioned above, e.g., the accelerator pedal position APO, the engine speed Ne, the cooling water temperature Tw, the vehicle speed VSP and so forth.

In step S20, the fuel injection quantity Qf is calculated on the basis of the operating state of the engine 1 read in the previous step. For example, the fuel injection quantity Qf is preferably calculated by referring to a pre-stored fuel injection quantity map in which the base fuel injection quantities Qfbase are allocated according to the accelerator pedal opening APO and the engine speed Ne. Upon calculating the Qfbase corresponding to the read APO and Ne, the calculated Qfbase is corrected according to the cooling water temperature Tw, and this corrected value thus obtained is setting as the fuel injection quantity Qf.

In step S30, the control unit 10 determines whether or not a fuel cut-off flag Fcut is set to 0. If the fuel cut-off flag Fcut is set to 0, then the routine proceeds to step S110. However, if fuel cut-off flag Fcut is not set to 0, then the routine proceeds to step S35. The fuel cut-off flag Fcut is usually set to 0 (when the specific fuel cut-off condition is not met), and is set to 1 when the specific fuel cut-off condition has been met (see FIG. 14).

In step S35, a specific prescribed value CNT1, which determines the delay time of the fuel cut-off, is set. This specific prescribed value CNT1 is set in the delay time setting routine (FIG. 14) discussed below.

In step S70, the count value CNT is incremented by one. This count value CNT indicates the elapsed time since the fuel cut-off condition was met (since the fuel cut-off flag Fcut was set to 1).

In step S80, the control unit 10 determines whether or not the incremented CNT has reached the specific prescribed value CNT1. If the value of CNT has reached the specific prescribed value CNT1, then the routine proceeds to step S90, but if the value of CNT has not been reached the specific prescribed value CNT1, then the routine proceeds to step S110.

In step S90, the count value CNT is cleared (CNT=0) since the control unit 10 has already determined that the time (delay time) determined by the specific prescribed value CNT1 has elapsed because the fuel cut-off condition was met.

In step S100, the fuel injection quantity Qf is set to 0. As a result, the supply of fuel to the engine 1 is stopped after the specific delay time has elapsed since the fuel cut-off condition was met.

In step S110, the fuel injection quantity Qf set as above is termed the output injection quantity Qfset, and a drive pulse Ti corresponding to this output injection quantity Qfset is outputted to the fuel injectors. As a result, the fuel injectors are driven by this drive pulse Ti, and fuel is supplied to the engine 1 in the output injection quantity Qfset. However, when the fuel cut-off condition is met, as discussed above, the supply of fuel to the engine 1 is stopped after a delay time corresponding to CNT1 has elapsed.

In this embodiment, as in the all of the prior embodiments, the control unit 10 preferably executes the fuel cut-off routine of the flowchart shown in FIG. 3 as discussed above. This fuel cut-off routine is actuated by turning on the ignition switch, and is executed at specific time intervals thereafter. The fuel cut-off determination flag Fcut is set in this routine as discussed above.

FIG. 14 is a flowchart of the routine for setting the delay time of fuel cut-off, and is executed at specific time intervals. This flow determines the value to be set as the above-mentioned specific prescribed value CNT1.

In step S601, the idle switch signal SWid, the clutch pedal switch signal SWcl1, the neutral switch signal SWneu, and so forth are read by the control unit 10.

In step S602, the control unit 10 determines whether or not the fuel cut-off flag Fcut is set to 1. If the fuel cut-off flag Fcut set to 1, then the routine proceeds to step S608, and if the fuel cut-off flag Fcut is set to 0, then the routine proceeds to step S603.

In step S603, the control unit 10 determines whether or not the clutch pedal switch signal SWcl1 is set to 0. If the clutch pedal switch signal SWcl1 is set to 0, then the routine proceeds to step S604, and if the clutch pedal switch signal SWcl1 is set to 1, then the routine proceeds to step S607.

In step S604, the control unit 10 determines whether or not the neutral switch signal SWneu is set to 1. If the neutral switch signal SWneu is set to 1, then the routine proceeds to step S605, and if the neutral switch signal SWneu is set to 0, then the routine proceeds to step S607.

In step S605, the control unit 10 determines whether or not the idle switch signal SWid is set to 0. If the idle switch signal SWid is set to 0, then the routine proceeds to step S606, and if the idle switch signal SWid is set to 1, then the routine proceeds to step S607.

In step S606, an engine speed adjustment flag Fadj is set to 1. This is usually set to 0, and is set to 1 when the driver downshifts and performs an operation to match the engine speed to the post-shift engine speed.

In step S607, the engine speed adjustment flag Fadj is set to 0. Specifically, the fact that the accelerator pedal 9 has been depressed (SWid=0) when the clutch 2 is engaged (SWcl1=0) and the transmission 3 is in a neutral state can generally be inferred to mean that an engine speed adjustment operation (so-called double-clutching) has been performed, in which a quick downshift is performed by matching the engine speed to the post-shift engine speed so that the synchromesh mechanism matches the post-downshift gear speed. The above-mentioned step S602 to step S605 involve determining (inferring) whether or not the driver has performed an engine speed adjustment operation, the result of which is that Fadj is set to 1 in step S606 if an engine speed adjustment operation has been performed, and Fadj is set to 0 in step S607 if an engine speed adjustment operation has not been performed.

In the above-mentioned step S602, then the routine proceeds to step S608 if Fcut is set to 1, and in this step S608 as well, the control unit 10 determines whether or not the clutch pedal switch signal SWcl1 is 0. If the clutch pedal switch signal SWcl1 is 0, then the routine proceeds to step S609, and if the clutch pedal switch signal SWcl1 is set to 1, then the routine proceeds to step S612.

In step S609, the control unit 10 determines whether or not the engine speed adjustment flag Fadj is 1. If the engine speed adjustment flag Fadj is set to 1, then the routine proceeds to step S610. However, in step S609, if the engine speed adjustment flag Fadj is set to 0, then the routine proceeds to step S611.

In step S610, since the fuel cut-off condition was met after (immediately after) the above-mentioned engine speed adjustment operation (that is, double-clutching) was performed, the specific prescribed value CNT1 that determines the delay time of the fuel cut-off is set to the first value a1.

In step S611, it is considered that the fuel cut-off is performed in a normal state in which the clutch 2 is engaged (a state in which no engine speed adjustment operation is performed), and the specific prescribed value CNT1 that determines the delay time of the fuel cut-off is set to the second value a2 (>a1).

In step S612, it is considered that the fuel cut-off is performed in a state in which the clutch 2 is disengaged, so the specific prescribed value CNT1 that determines the delay time of the fuel cut-off is set to the third value a3 (<a2).

In the above description, the idle switch signal SWid is used to determine (detect) whether or not the accelerator pedal 9 has been operated, but the accelerator pedal opening APO may be used instead.

In step S610 to step S612, different delay times were set for the first value a1, second value a2, and third value a3, but these may be suitably set as dictated by the engine in question, as long as a1 and a3 are shorter times than a2. For example, a1 and a3 may be the same. Furthermore, in this case the settings may be such that a1=a3=0, so that the fuel cut-off is executed with no delay (that supply of fuel is stopped immediately after the fuel cut-off condition is met).

FIG. 15 is a time chart illustrating the changes during fuel cut-off in the embodiment described above.

The idle switch 27 is switched ON (SWid=1) when the accelerator pedal 9 has fully returned. At this point, if the engine speed Ne is greater than or equal to the fuel cut-off permissible speed Ne1, the fuel cut-off flag Fcut is set to 1 and the count value CNT is incremented (time t1).

[0031]=Here, if the first clutch pedal switch 25 is OFF and the clutch pedal 8 has not be depressed, as a rule the delay time CNT1 of the fuel cut-off is set to the relatively long second value a2, and the supply of fuel is continued (A1) until the count value CNT reaches the second value a2 (time t5). Accordingly, the engine speed Ne decreases gradually (B1).

However, when the idle switch 27 is switched from ON to OFF (the accelerator pedal 9 is depressed) in a state in which the first clutch pedal switch 25 is OFF and the neutral switch 28 is ON (time t3 to t4), it is decided that an engine speed adjustment operation (double-clutching) has been performed during a downshift (in this case, the fuel cut-off flag Fcut is also set to 0), and if the accelerator pedal 9 subsequently fully returns and the fuel cut-off flag Fcut is set to 1, the delay time CNT1 for fuel cut-off is set to the first value a1 (which is smaller than the second value a2, and is 0 here) (time t4), and the supply of fuel is stopped right away (A2). Accordingly, even if the engine speed Ne rises excessively as a result of the engine speed adjustment operation, the engine speed Ne will drop toward the target engine speed (that is, the post-downshift engine speed) TNe more quickly (B2) than when the supply of fuel is not stopped right away (B4).

On the other hand, when the fuel cut-off flag Fcut is set to 1 and the clutch pedal 8 is depressed to switch ON the first clutch pedal switch 25 (time t2), the delay time for fuel cut-off is set to the third value a3 (which is smaller than the second value a2, and is 0 here) (time t2), and the supply of fuel is stopped right away (A3). Accordingly, revving is prevented and the engine speed Ne drops more quickly (B3) than when the supply of fuel is not stopped right away (B5).

Further, when the accelerator pedal 9 is depressed or the engine speed Ne is less than or equal to the specific fuel resupply speed Ne2, the fuel cut-off flag Fcut is set to 0 and the supply of fuel is restarted.

With the embodiment described above, in the stoppage of the supply of fuel after a specific delay time has elapsed since a fuel cut-off condition was met, when the fuel cut-off condition is met after engine speed adjustment operation (double-clutching) has been performed, the first value a1 (=0) is set as the delay time, and otherwise the second value a2 (>a1) is set as the delay time. Therefore, when the clutch 2 is engaged, as a rule the deceleration shock caused by fuel cut-off is prevented, and the target post-downshift engine speed TNe is quickly lowered even if the engine speed rises too high as a result of double-clutching during downshifting, so engine speed adjustment can be easily accomplished during a downshift.

Whether or not the above-mentioned engine speed adjustment operation has been performed can be easily determined by confirming the operation of the first clutch pedal switch 25, the neutral switch 28, and the idle switch 27 (step S603 to step S605).

Also, in performing the fuel cut-off, when the clutch 2 is disengaged, the third value a3 (=0) is set as the delay time, so revving of the engine due to disengagement of the clutch 2 is prevented and engine speed can be lowered quickly, allowing faster shifts without any shock, particularly during upshifts.

In the above embodiment, the fuel cut-off condition requires that (1) the idle switch signal SWid be 1 and (2) the engine speed Ne be greater than or equal to the fuel cut-off permissible speed Ne1 (see FIG. 3), but since the engine speed Ne rises when the engine speed adjustment operation (double-clutching) is performed, in this case if just (1) above is determined, it can be concluded that the fuel cut-off condition has been met. Therefore, fuel cut-off determination after the engine speed adjustment operation (double-clutching) can be accomplished by determining whether or not the fuel cut-off condition has been met just from (1) above, rather than employing the ordinary fuel cut-off determination (FIG. 3).

Also, in the above embodiment, the description focused on fuel cut-off performed for the main purpose of lowering fuel consumption, but if the engine speed adjustment operation (double-clutching) is the only concern, then the fact that the driver lifts off from the accelerator pedal (the accelerator pedal 9 returns) after this engine speed adjustment operation can be inferred to mean that the engine speed has risen too high, so in such a case it is possible that the supply of fuel will be stopped immediately in order to lower the engine speed quickly.

Specifically, when an engine speed adjustment operation has been performed (when the clutch pedal switch signal SWcl1=0, the neutral switch signal SWneu=1, and the idle switch signal SWid=0), and when the driver then stops depressing the accelerator pedal 9 (that is, when the idle switch signal SWid is switched from 0 to 1), if the fuel injection quantity Qf is set to 0 and left there for a specific period, adjustment of engine speed during a downshift will be extremely easy. This is because there is a greater margin of error in the accelerator pedal operation during engine speed adjustment (the accelerator pedal may be depressed a little more than necessary).

In a case such as this, basically the above-mentioned fuel cut-off condition ends up being met, but there is not need for fuel cut-off determination to be performed actively. Also, the period over which the supply of fuel is stopped (the above-mentioned specific period) may be set, for example, as dictated by the engine speed at that time, the amount of accelerator pedal operation, and so forth.

Seventh Embodiment

Figure 16:
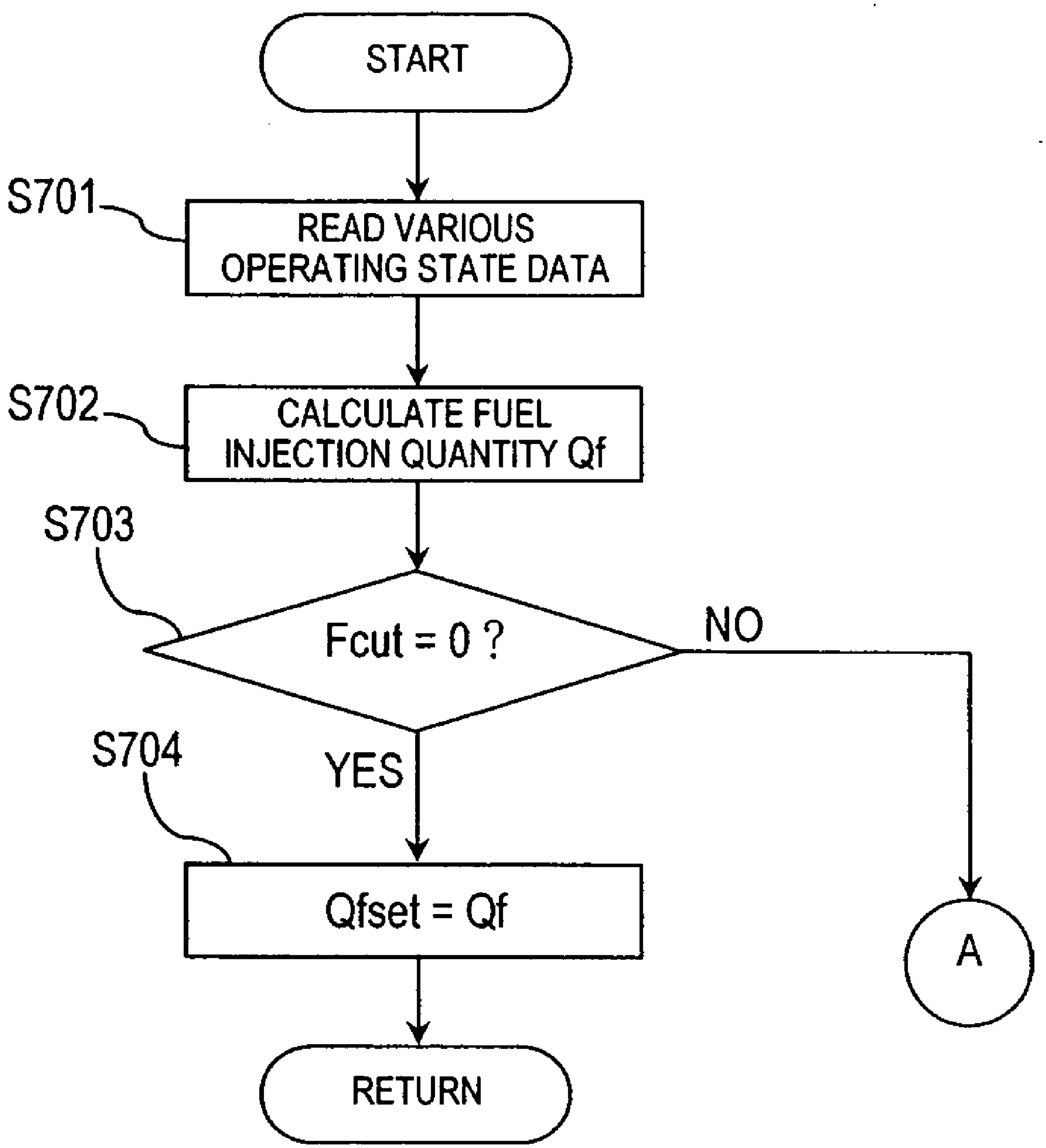
FIG. 16 is a first portion of a flowchart illustrating the processing executed by a first portion of a fuel injection control routine in accordance with a seventh embodiment of the present invention.
Figure 17:
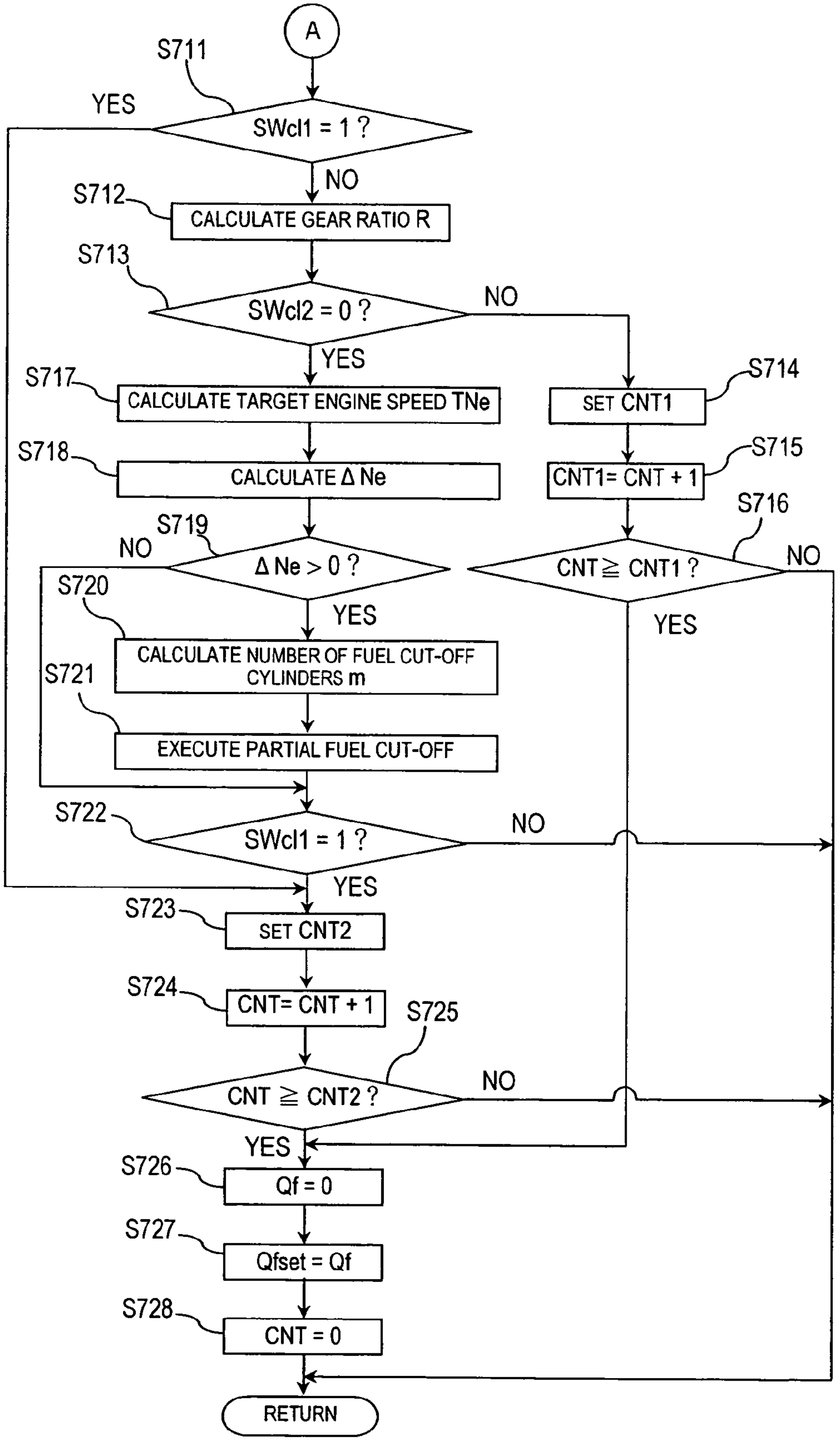
FIG. 17 is a second portion of a flowchart illustrating the processing executed by a second portion of a fuel injection control routine in accordance with the seventh embodiment of the present invention.

Referring now to FIGS. 16 and 17, further modified processing executed by the control unit 10 will be discussed in accordance with a seventh embodiment of the present invention. This seventh embodiment is carried out by the control unit 10 of the vehicle V that is equipped as shown in FIG. 1. In view of the similarity between the prior embodiments and this seventh embodiment, the parts or steps of the seventh embodiment that are identical to the parts or steps of the prior embodiments will be given the same reference numerals. Moreover, the descriptions of the parts or steps of the seventh embodiment that are identical to the parts or steps of the prior embodiments may be omitted for the sake of brevity. In other words, unless otherwise specified, the processing executed by the control unit 10 in the seventh embodiment is the same as the prior embodiments. Thus, the modified processing will now be discussed.

In this embodiment, similar to the sixth embodiment, a so-called clutch start system is employed, in which no current is sent to the starter motor (cell motor) if the ignition key (not shown) is turned to the engine start position without the clutch pedal 8 being depressed. The first clutch pedal switch 25 is used (doubles) as the above-mentioned clutch pedal switch for detecting the disengagement of the clutch 2 and for a clutch start system switch or sensor in this clutch start system.

With the seventh embodiment of the present invention, the engine control unit 10 controls the fuel being supply to the injectors of the engine 1. In particular, when the fuel cut-off condition is met and it is detected that the clutch 2 has been disengaged (that is, that a shift is in progress), the delay time for actually stopping the supply of fuel is varied. Even if the driver performs a clutch disengagement operation before the delay time for fuel cut-off has elapsed, if a semi-engaged state, in which the disengagement operation is still in its initial stage (prior to complete disengagement), is detected, the output of the engine is controlled such that the engine speed is maintained in the immediately-preceding engaged state, so revving of the engine can be effectively prevented even when the clutch operation by the driver is slow, or when a semi-engaged state is held (when the drive-side load has been substantially eliminated). As a result, particularly during an upshift, the decrease in engine speed brought about by the subsequent (after the elapse of the delay time) fuel cut-off can be accelerated, allowing a quick shift that is free of shock.

The operation of the control unit 10 of this seventh embodiment will now be described through reference to the flowchart shown in FIG. 16, which is a flowchart of the fuel injection quantity calculation routine also called the fuel injection control routine. This fuel injection quantity calculation routine is actuated by turning on the ignition switch, and is executed at specific time intervals thereafter. The fuel injection quantity Qf of the injectors are set in this routine.

In step S701, the operating state of the engine 1 is read by the control unit 10. In other words, the control unit 10 reads the detection signals which include, but not limited to signals mentioned above, e.g., the accelerator pedal position APO, the engine speed Ne, the cooling water temperature Tw, the vehicle speed VSP and so forth.

In step S702, the fuel injection quantity Qf is calculated on the basis of the operating state of the engine 1 read in the previous step. For example, the fuel injection quantity Qf is preferably calculated by referring to a pre-stored fuel injection quantity map in which the base fuel injection quantities Qfbase are allocated according to the accelerator pedal opening APO and the engine speed Ne. Upon calculating the Qfbase corresponding to the read APO and Ne, the calculated Qfbase is corrected according to the cooling water temperature Tw, and this corrected value thus obtained is setting as the fuel injection quantity Qf.

In step S703, the control unit 10 determines whether or not a fuel cut-off flag Fcut is 0. If the fuel cut-off flag Fcut is set to 0, then the routine proceeds to step S740, and if the fuel cut-off flag Fcut is set to 1, then the routine proceeds to step S711 (FIG. 17). The fuel cut-off flag Fcut is usually (when the specific fuel cut-off condition is not met) set to 0, and is set to 1 when the specific fuel cut-off condition has been met (see FIG. 3).

In step S704, the calculated fuel injection quantity Qf set as above is termed the output injection quantity Qfset, and a drive pulse Ti corresponding to this output injection quantity Qfset is outputted to the fuel injector valve. As a result, fuel is supplied to the various cylinders of the engine 1 in the output injection quantity Qfset.

In step S711 (FIG. 17), the first clutch pedal switch signal SWcl1 is read, and it is determined whether or not the read clutch pedal switch signal SWcl1 is 1. If the clutch pedal switch signal SWcl1 is set to 1, then the routine proceeds to step S723, and if the clutch pedal switch signal SWcl1 is set to 0, then the routine proceeds to step S712. The setting of the clutch pedal switch signal SWcl1 will be discussed below (see the description of step S722).

In step S712, the gear ratio R i.e., equal to engine speed Ne/vehicle speed VSP) at the current shift position, that is, at the shift position prior (immediately prior) to depression of the clutch pedal 8, is calculated.

In step S713, the second clutch pedal switch signal SWcl2 is read, and it is determined whether or not the read clutch pedal switch signal SWcl2 is set to 0. If the second clutch pedal switch signal SWcl2 is set to 0, then the routine proceeds to step S714, and if the second clutch pedal switch signal SWcl2 is set to 1, then the routine proceeds to step S717. The second clutch pedal switch 26 is usually ON when the clutch pedal 8 has not been depressed, and is switched OFF when the clutch pedal 8 is depressed, so the second clutch pedal switch signal SWcl2 is set to 0 when the second clutch pedal switch 26 is ON, and to 1 when this sensor is OFF (right after the clutch pedal 8 begins to be depressed). Therefore, if the second clutch pedal switch signal SWcl2 has been switched from 0 to 1, this means that the driver has depressed the clutch pedal 8, and in this embodiment when this signal SWcl2 is 1 and the clutch pedal switch signal SWcl1 is 0 is called the semi-engaged state of the clutch 2.

In step S714, a first value CNT1 that determines the length of the delay time of fuel cut-off to all of the cylinders (#1 to #n) is set when the clutch 2 is in an engaged state.

In step S715, the count value CNT is incremented by one. This count value CNT indicates the elapsed time since the fuel cut-off condition was met.

In step S716, the control unit 10 determines whether or not the incremented CNT has reached the first count value CNT1. If this value has been reached, then the routine proceeds to step S726, and otherwise this routine is concluded.

In step S717, the target engine speed TNe (i.e., equal to gear ratio R×vehicle speed VSP) is calculated. This target engine speed TNe corresponds to the engine speed Ne1 that should be maintained if the clutch 2 is engaged at the shift position prior to depression of the clutch pedal 8 (that is, the engine speed in the immediately-preceding engaged state of the clutch).

In step S718, the current engine speed Ne is detected, and the difference ΔNe (i.e., equal to Ne−TNe) between the detected engine speed Ne and the target engine speed TNe is calculated.

In step S719, the control unit 10 determines whether or not ΔNe is greater than 0. If ΔNe>0, then the routine proceeds to step S720, and if ΔNe≦0, then the routine proceeds to step S722. When ΔNe>0, the calculated ΔNe corresponds to the revving of the engine 1 caused by putting the clutch 2 in a semi-engaged state.

In step S720, the number of cylinders to be subjected to fuel cut-off (the number of fuel cut-off cylinders) m (i.e., equal to ΔNe/a), in order to decrease the above-mentioned revving (ΔNe) and bring the engine speed to the above-mentioned target engine speed TNe, is calculated. Here, the term "a" is set according to the number of cylinders for each engine. For example, if the engine speed reduced by subjecting one cylinder to fuel cut-off is 50 (100) rpm, then a=50 (100).

In step S721, the fuel injection quantity Qf for the calculated number of cylinders m is set to 0, and partial fuel cut-off is executed. For instance, when m=1, one of the cylinders (#a) is selected from among all the cylinders (#1 to #n), the fuel injection quantity $Qf_a$ of this selected cylinder is set to 0, the fuel injection quantity for all the other cylinders is left at Qf, these are termed the output injection quantity $Qfset_i$ (i=1 to n), and a drive pulse $Ti_i$ corresponding to each output injection quantity $Qfset_i$ is outputted to the fuel injector valve of each cylinder. As a result, even if there is revving of the engine 1 at the initial stage of depression of the clutch 2, the engine speed can be quickly matched to the target engine speed TNe.

In other words, the engine output suppression control is performed so that the engine speed corresponding to the operating state prior to clutch pedal operation (the target engine speed) is maintained immediately after the start of the depression of the clutch pedal 8 after the fuel cut-off condition has been met. The important thing is that the engine be controlled so as to maintain the target engine speed, and in addition to the partial fuel cut-off discussed above, it is also possible to uniformly reduce and correct the fuel injection quantity Qf (that is, the fuel injection quantity for all the cylinders), or to vary the ignition timing.

Then, in step S722, the first clutch pedal switch signal SWcl1 is read, and it is determined whether or not the read clutch pedal switch signal SWcl1 is 1. If the first clutch pedal switch signal SWcl1 is 1, then the routine proceeds to step S723, and if the first clutch pedal switch signal SWcl1 is 0, this routine is concluded. This clutch pedal switch signal SWcl1 is set to 1 when the clutch pedal 8 is depressed and the clutch 2 is completely disengaged, and otherwise is set to 0.

In step S723, a second value CNT2 (<CNT1) that determines the length of the delay time for fuel cut-off to be performed for all cylinders (#1 to #n) is set when the clutch 2 is in a (fully) disengaged state. This second value CNT2 may be set to 0 so that the fuel cut-off is performed with no delay time.

In step S724, the count value CNT is incremented by 1.

In step S725, the control unit 10 determines whether or not the incremented count value CNT has reached the above-mentioned second value CNT2. If this value has been reached, then the routine proceeds to step S726, and otherwise this routine is concluded.

In step S726 (FIG. 17), it is considered that a specific delay time (CNT1 or CNT2) has elapsed since the fuel cut-off condition was met, and the fuel injection quantity Qf is set to 0.

In step S727, the set fuel injection quantity Qf is termed the output injection quantity Qfset, and a drive pulse Ti corresponding to this output injection quantity Qfset is outputted to the fuel injector valves of the various cylinders. As a result, when the clutch 2 is engaged after the fuel cut-off condition has been met, fuel cut-off is executed for all cylinders after the first value CNT1 has elapsed, and when the clutch 2 is fully disengaged after the fuel cut-off condition has been met, fuel cut-off is executed for all cylinders after the second value CNT2 (<CNT1) has elapsed.

If fuel cut-off is executed for all of the cylinders, then the count value CNT is cleared (CNT=0) in step S728 and the routine is concluded.

The flowchart of FIG. 3, discussed above, is the routine for setting the delay time of fuel cut-off, which is executed at specific time intervals.

The time chart of FIG. 15 is also used to illustrate the changes during fuel cut-off in this seventh embodiment described above. In particular, the idle switch 27 is switched ON (SWid=1) when the accelerator pedal 9 has fully returned. At this point, if the engine speed Ne is greater than or equal to the fuel cut-off permissible speed Ne1, the fuel cut-off flag Fcut is set to 1 and the count value CNT is incremented (time t1).

Here, if the clutch switch (clutch pedal switch) 25 is OFF and the clutch pedal 8 has not be depressed, then the delay time of the fuel cut-off is set to the relatively long first value CNT1, and the supply of fuel is continued (A1) until the count value CNT reaches the first value CNT1 (time t4). Accordingly, the engine speed Ne decreases gradually (B1).

Meanwhile, when the clutch pedal 8 is depressed and the second clutch pedal switch 26 is switched OFF (SWcl2=1), if the clutch 2 is engaged, the held engine speed is termed the target engine speed TNe, and when the current engine speed Ne exceeds this target engine speed TNe, engine output suppression control (partial fuel cut-off) is commenced so as to lower the engine speed by the exceeded amount (the amount of revving) (time t2). Accordingly, the engine speed Ne is maintained at the speed immediately prior to the depression of the clutch pedal 8 (the target engine speed TNe) (B2).

When the clutch pedal 8 is depressed and the first clutch pedal switch 25 is switched ON (SWcl1=1), the clutch 2 is fully disengaged, the delay time of the fuel cut-off is set to the second value CNT2 (which is less than the first value CNT1, and is 0 here) (time t3), and the supply of fuel is immediately stopped (A3). This results in a quick decrease in the engine speed Ne (B3).

After this, when the shift operation (upshift) is concluded and the accelerator pedal 9 is depressed, or when the engine speed Ne becomes less than or equal to a specific fuel re-supply speed Ne2, the fuel cut-off flag Fcut is set to 0 and the supply of fuel is restarted.

Figure 18:
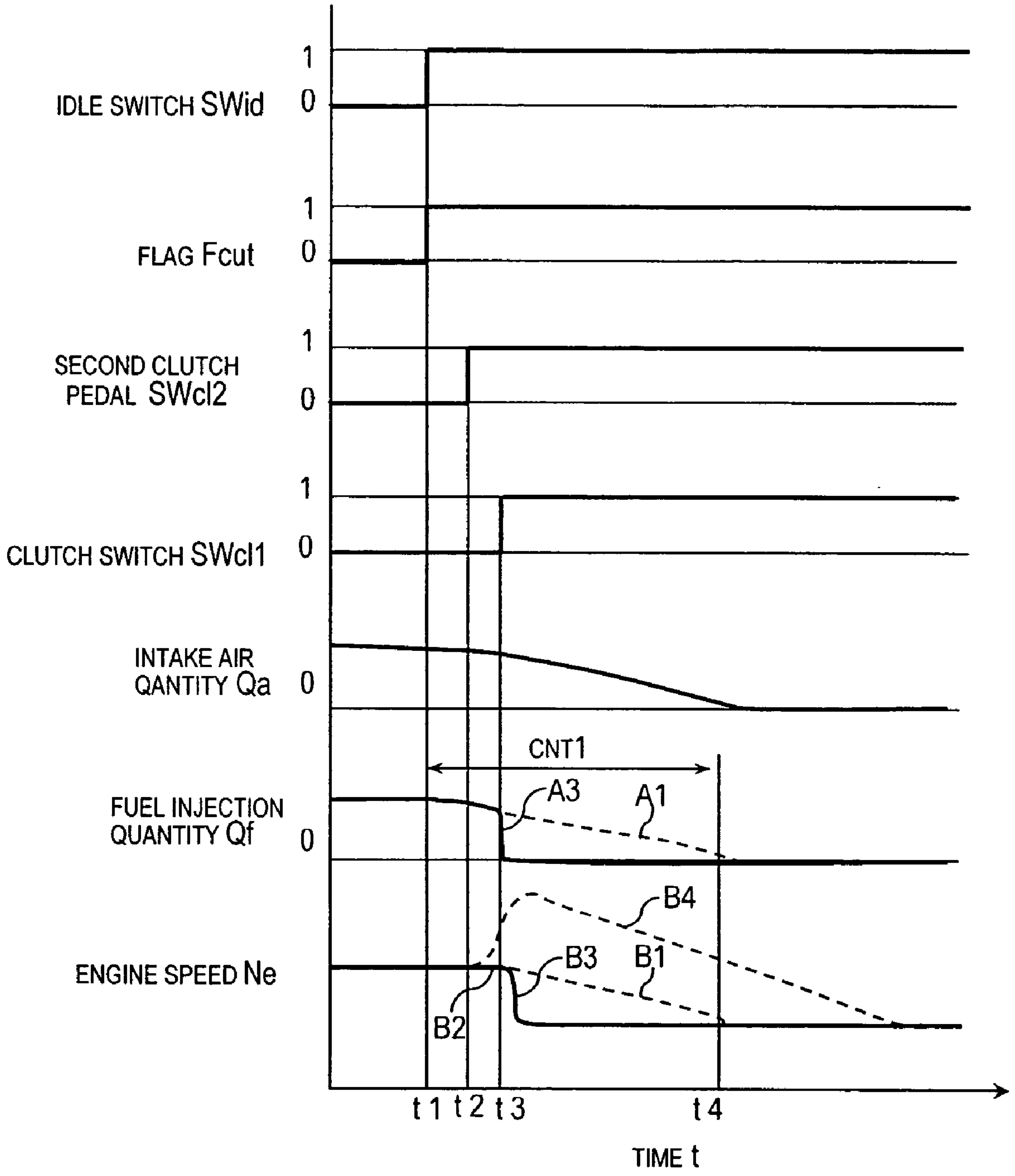
FIG. 18 is a time chart illustrating the change in the fuel injection quantity and other parameters during fuel cut-off by the engine fuel supply control device in accordance with the seventh embodiment of the present invention.

With the embodiment described above, in the stoppage of the supply of fuel after a specific delay time has elapsed since a fuel cut-off condition was met, when the delay time has not yet elapsed and the clutch 2 is in a semi-engaged state, output (suppression) control of the engine 1 is performed (step S713 to step S721, B2 in FIG. 18) so as to maintain the engine speed (target engine speed TNe) in the immediately-preceding engaged state of the clutch, so engine revving can be effectively prevented in a state in which load on the drive side is substantially eliminated before the clutch 2 is fully disengaged. As a result, particularly during an upshift, the decrease in engine speed brought about by the subsequent (after the elapse of the delay time) fuel cut-off can be accelerated, allowing a quick shift that is free of shock.

Also, in performing fuel cut-off, the delay time is made shorter when the clutch 2 is in a disengaged state than when otherwise (when it is in an engaged state), so deceleration shock can be prevented (A1 in FIG. 18) by setting a longer delay time (CNT1) when the clutch 2 is in an engaged state (step S714), and the engine speed can be lowered more quickly (B3 in FIG. 18) by setting a shorter delay time (or one of 0) (CNT2) during a shift (upshift) in which the clutch 2 is disengaged (step S723). As discussed above, when the clutch 2 is in a semi-engaged state, the output of the engine 1 is controlled so as to maintain the engine speed, so engine revving in this semi-engaged state (B4 in FIG. 18) can also be prevented, and therefore quick shifts that are free of shock can be performed more effectively, and particularly during an upshift.

Also, in this embodiment, the output control of the engine 1 consisted of engine output control (suppression control) performed only when needed, in which when the difference ΔNe between the engine speed when the clutch 2 is in a semi-engaged state and the engine speed in the immediately-preceding engaged state of the clutch (the target engine speed TNe) is greater than 0, the amount of fuel supplied is reduced according to this difference ΔNe (the supply of fuel is stopped to some of the cylinders) (step S713 to step S721). Also, deceleration shock can be prevented during fuel cut-off, and shift feel improved, merely by controlling the amount of fuel supplied.

Further, in the embodiment described above, engine output control (suppression control) was performed after the fuel cut-off condition was met, but engine output control (suppression control) may also be performed while the clutch 2 is in a semi-engaged state before the fuel cut-off condition is determined, and as a result, engine output control (suppression control) may be performed between fuel cut-off determination and the disengagement of the clutch 2 (in other words, before the delay time has elapsed).

As used herein to describe the present invention, the following directional terms “forward, rearward, above, downward, vertical, horizontal, below and transverse” as well as any other similar directional terms refer to those directions of a vehicle equipped with the present invention. Accordingly, these terms, as utilized to describe the present invention should be interpreted relative to a vehicle equipped with the present invention. The term “configured” as used herein to describe a component, section or part of a device includes hardware and/or software that is constructed and/or programmed to carry out the desired function. Moreover, terms that are expressed as “means-plus function” in the claims should include any structure that can be utilized to carry out the function of that part of the present invention. The terms of degree such as “substantially”, “about” and “approximately” as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to each of the following Japanese Patent Application Nos. 2003-407894, 2003-407895, 2003-407896, 2003-407897 and 2003-407898. The entire disclosures of Japanese Patent Application Nos. 2003-

407894, 2003-407895, 2003-407896, 2003-407897 and 2003-407898 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine fuel supply control device for an engine connected to a drive wheel via a driver operable clutch and a transmission disposed between the engine and the drive wheel, the engine fuel supply control device comprising:

an operating state detection section configured to detect at least one of a clutch position of the driver operable clutch based on a depression amount of a clutch pedal and a shifting operation of the transmission;

a fuel cut-off determination section configured to determine if a specific fuel cut-off condition has been met; and a fuel supply stoppage section configured to stop a supply of fuel to the engine when a specific delay time has elapsed since the specific fuel cut-off condition was met, the fuel supply stoppage section being further configured to selectively set the specific delay time to different lengths of time depending on a detection status of either the clutch position being disengaged or the shifting operation being in progress with the detection status being detected after the specific fuel cut-off condition was met, the fuel supply stoppage section being further configured to set a first delay time as the specific delay time to immediately stop supplying fuel to the engine upon detection of the clutch position being disengaged or the shifting operation being in progress, and to selectively set the specific delay time to a second delay time whose length is longer than the first delay time when either the clutch has not been detected as disengaged or the shifting operation is not in progress.

2. The engine fuel supply control device according to claim 1, wherein the fuel cut-off determination section is further configured to determine that the fuel cut-off condition has been met when an idle operation demand to the engine is detected.

3. The engine fuel supply control device according to claim 1, wherein the fuel supply stoppage section is further configured to immediately stop supplying fuel upon detection that the clutch has been disengaged after the fuel cut-off condition has been met and if the first delay time has been set.

4. The engine fuel supply control device according to claim 1, wherein the operating state detection section includes a clutch disengagement detection section configured to detect when the clutch position of the clutch is in a disengaged position according to a position of a clutch pedal.

5. An engine fuel supply control device for an engine connected to a drive wheel via a driver operable clutch and a transmission disposed between the engine and the drive wheel, the engine fuel supply control device comprising:

an operating state detection section configured to detect at least one of a clutch position of the driver operable clutch and a shifting operation of the transmission;

a fuel cut-off determination section configured to determine if a specific fuel cut-off condition has been met; and a fuel supply stoppage section configured to stop a supply of fuel to the engine when a specific delay time has elapsed since the specific fuel cut-off condition was met, the fuel supply stoppage section being further configured to selectively set the specific delay time to different lengths of time depending on a detection status of either the clutch position being disengaged or the shifting operation being in progress, the operating state detection section including a clutch disengagement detection section configured to detect when the clutch position of the clutch is in a disengaged position based on an output signal from an engine inhibitor switch that prevents the engine from being started except when the clutch is disengaged.

6. The engine fuel supply control device according to claim 1, wherein the operating state detection section includes a shifting detection section configured to detect that the shifting operation is in progress by determining a current gear is shifted to another gear.

7. An engine fuel supply control device for an engine connected to a drive wheel via a driver operable clutch and a transmission disposed between the engine and the drive wheel, the engine fuel supply control device comprising:

an operating state detection section configured to detect at least one of a clutch position of the driver operable clutch based on a depression amount of a clutch pedal and a shifting operation of the transmission;

a fuel cut-off determination section configured to determine if a specific fuel cut-off condition has been met; and a fuel supply stoppage section configured to stop a supply of fuel to the engine when a specific delay time has elapsed since the specific fuel cut-off condition was met, the fuel supply stoppage section being further configured to selectively set the specific delay time to different lengths of time depending on a detection status of either the clutch position being disengaged or the shifting operation being in progress with the detection status being detected after the specific fuel cut-off condition was met, the operating state detection section including a clutch disengagement detection section configured to detect when the clutch position of the clutch is in a disengaged position, the operating state detection section further including a shift determination section configured to detect whether the shifting operation is an upshift, in which a gear ratio is lowered from a current gear ratio, or a downshift in the gear ratio is raised over the current ratio, and the fuel supply stoppage section being configured to selectively set a first delay time as the specific delay time when an upshift is in progress, and set a second delay time as the specific delay time when a downshift is in progress, upon the clutch disengagement detection section detects the clutch is in the disengaged position.

8. The engine fuel supply control device according to claim 7, wherein the fuel supply stoppage section is further configured to set the first delay time to be shorter for an upshifting operation than the second delay time for a downshifting operation.

9. The engine fuel supply control device according to claim 8, wherein the fuel supply stoppage section is further configured to immediately stop supplying fuel upon detection that the clutch has been disengaged after the fuel cut-off condition has been met and if the first delay time has been set.

10. The engine fuel supply control device according to claim 8, wherein the shift determination section is configured to detect movement of a shift lever operated by the driver to determine whether an upshifting operation or a downshifting operation is in progress.

11. The engine fuel supply control device according to claim 7, wherein the shift determination section is configured to detect an engine speed and determine a gear position such that the shift determination section is configured to determine whether an upshifting operation or a downshifting operation is in progress based on the engine speed and the gear position.

12. The engine fuel supply control device according to claim 11, wherein the shift determination section is further configured to detect a vehicle speed with the gear position being determined based of the engine speed and the vehicle speed.

13. The engine fuel supply control device according to claim 7, wherein the clutch disengagement detection section is further configured to detect that the clutch position of the clutch is in the disengaged position based on an output signal from an engine inhibitor switch that prevents the engine from being started except when the clutch is disengaged.

14. The engine fuel supply control device according to claim 1, wherein the operating state detection section includes a shifting detection section configured to detect the shifting operation as a shift in progress by determining a current gear is shifted to another gear; and the operating state detection section further includes a shift determination section configured to detect whether the shifting operation is an upshift, in which a gear ratio is lowered from a current gear ratio.

15. An engine fuel supply control device for an engine connected to a drive wheel via a driver operable clutch and a transmission disposed between the engine and the drive wheel, the engine fuel supply control device comprising:

an operating state detection section configured to detect at least one of a clutch position of the driver operable clutch based on a depression amount of a clutch pedal and a shifting operation of the transmission;

a fuel cut-off determination section configured to determine if a specific fuel cut-off condition has been met; and a fuel supply stoppage section configured to stop a supply of fuel to the engine when a specific delay time has elapsed since the specific fuel cut-off condition was met, the fuel supply stoppage section being further configured to selectively set the specific delay time to different lengths of time depending on a detection status of either the clutch position being disengaged or the shifting operation being in progress with the detection status being detected after the specific fuel cut-off condition was met, the operating state detection section including a clutch disengagement detection section configured to detect when the clutch position of the clutch is in a disengaged position, and the fuel supply stoppage section being configured to set a first delay time as the specific delay time, upon detecting that the clutch has been disengaged after the fuel cut-off condition has been met during a single clutch operation from an engagement to a disengagement of the clutch, and to set a second delay time as the specific delay time upon detecting that the clutch has been disengaged before the fuel cut-off condition has been met during the single clutch operation.

16. The engine fuel supply control device according to claim 15, wherein the fuel supply stoppage section is further configured to set the first delay time to be shorter than the second delay time.

17. The engine fuel supply control device according to claim 15, wherein the fuel supply stoppage section is further configured to set the second delay time to zero.

18. The engine fuel supply control device according to claim 16, wherein the operating state detection section includes a shift determination section configured to detect whether the shifting operation is an upshift, in which a gear ratio is lowered from a current gear ratio, or a downshift in the gear ratio is raised over the current ratio; and the fuel supply stoppage section is further configured to set one of the first and second delay times when a downshift is in progress and a third delay time when an upshift is in progress, upon the clutch disengagement detection section detecting the clutch position of the clutch is in a disengaged position.

19. The engine fuel supply control device according to claim 16, wherein the fuel supply stoppage section is further configured to set the specific delay time as a fourth delay time, which is longer than the second delay time, except upon the clutch disengagement detection section detecting the clutch position of the clutch is in a disengaged position.

20. The engine fuel supply control device according to claim 15, wherein the clutch disengagement detection section is further configured to detect that the clutch position of the clutch is in a disengaged position based on an output signal from an engine inhibitor switch that prevents the engine from being started except when the clutch is disengaged.

21. The engine fuel supply control device according to claim 1, wherein the operating state detection section includes a shifting detection section configured to detect the shifting operation as a shift in progress, in which a current gear is shifted to another gear;

the operating state detection section further includes a shift determination section configured to detect whether the shifting operation is a downshift in which a current gear ratio is raised; and the fuel supply stoppage section is further configured to set a first delay time as the specific delay time according to whether the fuel cut-off condition is currently being met upon detection that a downshifting operation is in progress.

22. The engine fuel supply control device according to claim 1, wherein the operating state detection section includes a clutch disengagement detection section configured to detect when the clutch position of the clutch is in a disengaged position; and the fuel supply stoppage section is further configured to immediately stop supplying fuel to the engine when the fuel cut-off condition has been met after detecting that the clutch position of the clutch is in the disengaged position.

23. The engine fuel supply control device according to claim 22, wherein the fuel supply stoppage section is further configured to immediately stop supplying fuel to the engine by setting the specific delay time to zero.

24. The engine fuel supply control device according to claim 1, wherein the operating state detection section includes a clutch disengagement detection section configured to detect when the clutch position of the clutch is in a disengaged position;

the fuel cut-off determination section is further configured to determine the fuel cut-off condition has been at least partially met when an accelerator pedal depression amount is less than or equal to a specific accelerator pedal depression value; and the fuel supply stoppage section is further configured to immediately stop supplying fuel to the engine when the accelerator pedal depression amount reaches the specific accelerator pedal depression value within a single clutch operation from engagement to disengagement of the clutch such that the fuel cut-off condition is no longer met in the single clutch operation.

25. An engine fuel supply control device for an engine connected to a drive wheel via a driver operable clutch and a transmission disposed between the engine and the drive wheel, the engine fuel supply control device comprising:

an operating state detection section configured to detect at least one of a clutch position of the driver operable clutch based on a depression amount of a clutch pedal and a shifting operation of the transmission;

a fuel cut-off determination section configured to determine if a specific fuel cut-off condition has been met; and a fuel supply stoppage section configured to stop a supply of fuel to the engine when a specific delay time has elapsed since the specific fuel cut-off condition was met, the fuel supply stoppage section being further configured to selectively set the specific delay time to different lengths of time depending on a detection status of either the clutch position being disengaged or the shifting operation being in progress with the detection status being detected after the specific fuel cut-off condition was met, the operating state detection section including a clutch engagement/disengagement detection section configured to detect when the clutch position of the clutch is in one of a disengaged position and an engaged position, the operating state detection section further including an engine speed adjustment operation determination section configured to determine if an engine speed adjustment operation has been performed that adjusts an engine speed to a post-shift speed, and the fuel supply stoppage section being further configured to set as the specific delay time to a first value if the fuel cut-off condition is met after the engine speed adjustment operation has been performed, and otherwise to a second value which is longer than the first value when the clutch is engaged.

26. The engine fuel supply control device according to claim 25, wherein the operating state detection section further includes a neutral state detection section configured to detect that the transmission is in a neutral state;

the operating state detection section further includes an accelerator pedal operating state detection section configured to detect operation of an accelerator pedal; and the engine speed adjustment operation determination section is further configured to determine that the engine speed adjustment operation has been performed if the clutch is engaged and the accelerator pedal has been operated while the transmission is in the neutral state.

27. The engine fuel supply control device according to claim 25, wherein the fuel supply stoppage section is further configured to set a third value as the specific delay time that is smaller than the second value when the clutch is disengaged.

28. The engine fuel supply control device according to claim 27, wherein the fuel supply stoppage section is further configured to set at least one of the first and third values to zero.

29. The engine fuel supply control device according to claim 1, wherein the operating state detection section includes a clutch engagement/disengagement detection section configured to detect when the clutch position of the clutch is in one of a disengaged position and an engaged position;

the operating state detection section includes a neutral state detection section configured to detect that the transmission is in a neutral state;

the operating state detection section includes an accelerator pedal operating state detection section configured to detect an accelerator pedal operation of an accelerator pedal; and the fuel supply stoppage section is further configured to stop supplying fuel once the accelerator pedal operation has ceased when the accelerator pedal has been operated while the clutch is engaged and the transmission is in the neutral state.

30. An engine fuel supply control device for an engine connected to a drive wheel via a driver operable clutch and a transmission disposed between the engine and the drive wheel, the engine fuel supply control device comprising:

an operating state detection section configured to detect at least one of a clutch position of the driver operable clutch and a shifting operation of the transmission;

a fuel cut-off determination section configured to determine if a specific fuel cut-off condition has been met;

a fuel supply stoppage section configured to stop a supply of fuel to the engine when a specific delay time has elapsed since the specific fuel cut-off condition was met, the fuel supply stoppage section being further configured to selectively set the specific delay time to different lengths of time depending on a detection status of either the clutch position being disengaged or the shifting operation being in progress;

an engine speed detection section configured to detect an engine rotational speed of the engine; and an output control section configured to control an engine output such that the engine rotational speed is maintained in an immediately-preceding clutch engaged state when the specific delay time has not yet elapsed and the clutch is in a semi-engaged state.

31. The engine fuel supply control device according to claim 30, wherein the operating state detection section includes a clutch disengagement detection section configured to detect when the clutch position of the clutch is in a disengaged position; and the fuel supply stoppage section is configured to set the specific delay time shorter when the clutch is disengaged than when otherwise.

32. The engine fuel supply control device according to claim 31, wherein the fuel supply stoppage section is configured to immediately stop supplying fuel upon detection that the clutch position of the clutch is in a disengaged position.

33. The engine fuel supply control device according to claim 30, wherein the output control section is configured to control the engine output when the clutch is in the semi-engaged state and the engine rotational speed is higher than the engine rotational speed in the immediately-preceding engaged state of the clutch.

34. The engine fuel supply control device according to claim 30, wherein the output control section is configured to reduce the fuel being supplied according to a difference between the engine rotational speed while the clutch is in the semi-engaged state and the engine rotational speed in the immediately-preceding engaged state of the clutch.

35. The engine fuel supply control device according to claim 34, wherein the output control section is configured to reduce the fuel being supplied by stopping supply of the fuel to some cylinders of the engine.

36. An engine fuel supply control device for an engine connected to a drive wheel via a driver operable clutch and a transmission disposed between the engine and the drive wheel, the engine fuel supply control device comprising:

operating state detection means for detecting at least one of a clutch position of the driver operable clutch based on a depression amount of a clutch pedal and a shifting operation of the transmission;

fuel cut-off determination means for determining if a specific fuel cut-off condition has been met; and fuel supply stoppage means for stopping fuel supply to the engine when a specific delay time has elapsed since the specific fuel cut-off condition was met, and for selectively setting the specific delay time to different lengths of time depending on a detection status of either the clutch position being disengaged or the shifting operation being in progress with the detection status being detected after the specific fuel cut-off condition was met, the fuel supply stoppage means further including a function for setting a first delay time as the specific delay time to immediately stop supplying fuel to the engine upon detection of the clutch position being disengaged or the shifting operation being in progress, and for selectively setting the specific delay time to a second delay time whose length is longer than the first delay time when either the clutch has not been detected as disengaged or the shifting operation is not in progress.

37. A method of controlling an engine fuel supply for an engine connected to a drive wheel via a driver operable clutch and a transmission disposed between the engine and the drive wheel, the engine fuel supply control device comprising:

detecting at least one of a clutch position of the driver operable clutch detected based on a depression amount of a clutch pedal and a shifting operation of the transmission;

determining if a specific fuel cut-off condition has been met;

stopping fuel supply to the engine when a specific delay time has elapsed since the specific fuel cut-off condition was met;

setting the specific delay time to different lengths of time depending on a detection status of either the clutch position being disengaged or the shifting operation being in progress with the detection status being detected after the specific fuel cut-off condition was met, the setting of the specific delay time including setting a first delay time as the specific delay time to immediately stop supplying fuel to the engine upon detection of the clutch position being disengaged or the shifting operation being in progress, and selectively setting the specific delay time to a second delay time whose length is longer than the first delay time when either the clutch has not been detected as disengaged or the shifting operation is not in progress.

* * * * *